(12) United States Patent
Yamamoto et al.

(10) Patent No.: US 8,856,403 B2
(45) Date of Patent: Oct. 7, 2014

(54) COMMUNICATION MODULE, COMMUNICATION SYSTEM AND AIR CONDITIONER

(75) Inventors: Ryousuke Yamamoto, Osaka (JP); Satoshi Yagi, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 671 days.

(21) Appl. No.: 13/120,113

(22) PCT Filed: Sep. 4, 2009

(86) PCT No.: PCT/JP2009/065529
§ 371 (c)(1),
(2), (4) Date: Mar. 21, 2011

(87) PCT Pub. No.: WO2010/032637
PCT Pub. Date: Mar. 25, 2010

(65) Prior Publication Data
US 2011/0167861 A1    Jul. 14, 2011

(30) Foreign Application Priority Data
Sep. 22, 2008    (JP) ................. 2008-242052

(51) Int. Cl.
*H04L 12/42* (2006.01)
*F24F 11/00* (2006.01)
*H04L 12/28* (2006.01)
*H04L 12/40* (2006.01)

(52) U.S. Cl.
CPC .......... *H04L 12/2823* (2013.01); *F24F 11/006* (2013.01); *F24F 2011/0068* (2013.01); *H04L 12/40013* (2013.01)
USPC ........................................................ 710/38

(58) Field of Classification Search
CPC ..... H04L 12/42; H04L 12/422; H04L 12/423; H04L 12/427; H04L 12/43; H04L 12/437
See application file for complete search history.

(56) References Cited

U.S. PATENT DOCUMENTS 4,542,479 A * 9/1985 Kamimura et al. ............. 700/79

FOREIGN PATENT DOCUMENTS

| JP | 59-228451 A | 12/1984 |
| JP | 60-154746 | * 8/1985 |
| JP | 60-154746 A | 8/1985 |
| JP | 63-80156 A | 4/1988 |
| JP | 2-305145 A | 12/1990 |
| JP | 2002-213803 | * 7/2002 |
| JP | 2002-213803 A | 7/2002 |
| JP | 2006-20117 A | 1/2006 |

\* cited by examiner

*Primary Examiner* — Ilwoo Park
(74) *Attorney, Agent, or Firm* — Birch, Stewart, Kolasch & Birch, LLP

(57) ABSTRACT

First and third current paths are connected at mutual one end, and second and fourth current paths are connected at mutual one end. A transmitter sends signals utilizing the change of a current by changing the current flowing between other ends of the first and second current paths. A switching part brings about a non-conductive state between the other end of the third current path and the other end of the fourth current path by being applied with a control signal from a controller. By contrast with this, the switching part brings about a conductive state between the other end of the third current path and the other end of the fourth current path by not being applied the control signal.

10 Claims, 21 Drawing Sheets

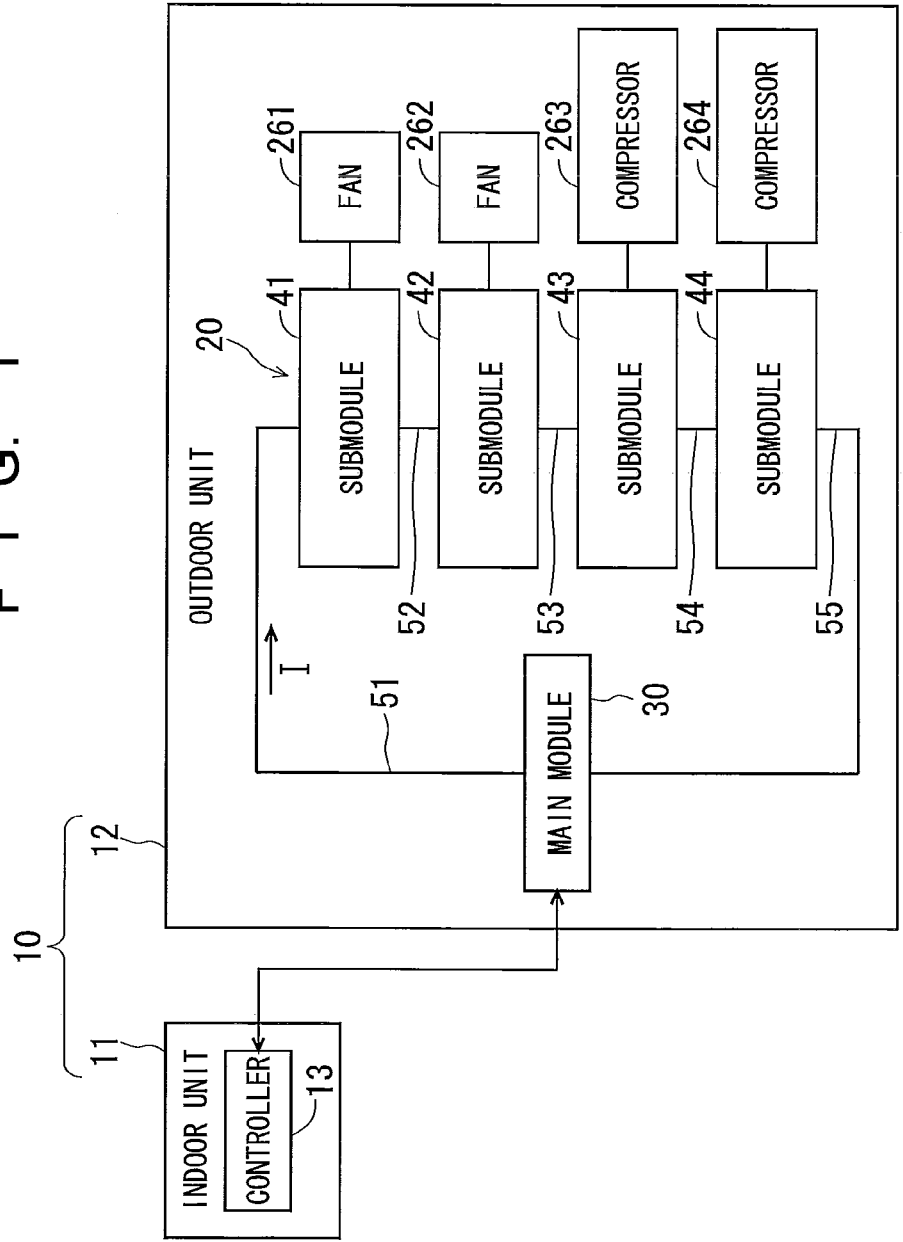

F I G. 3
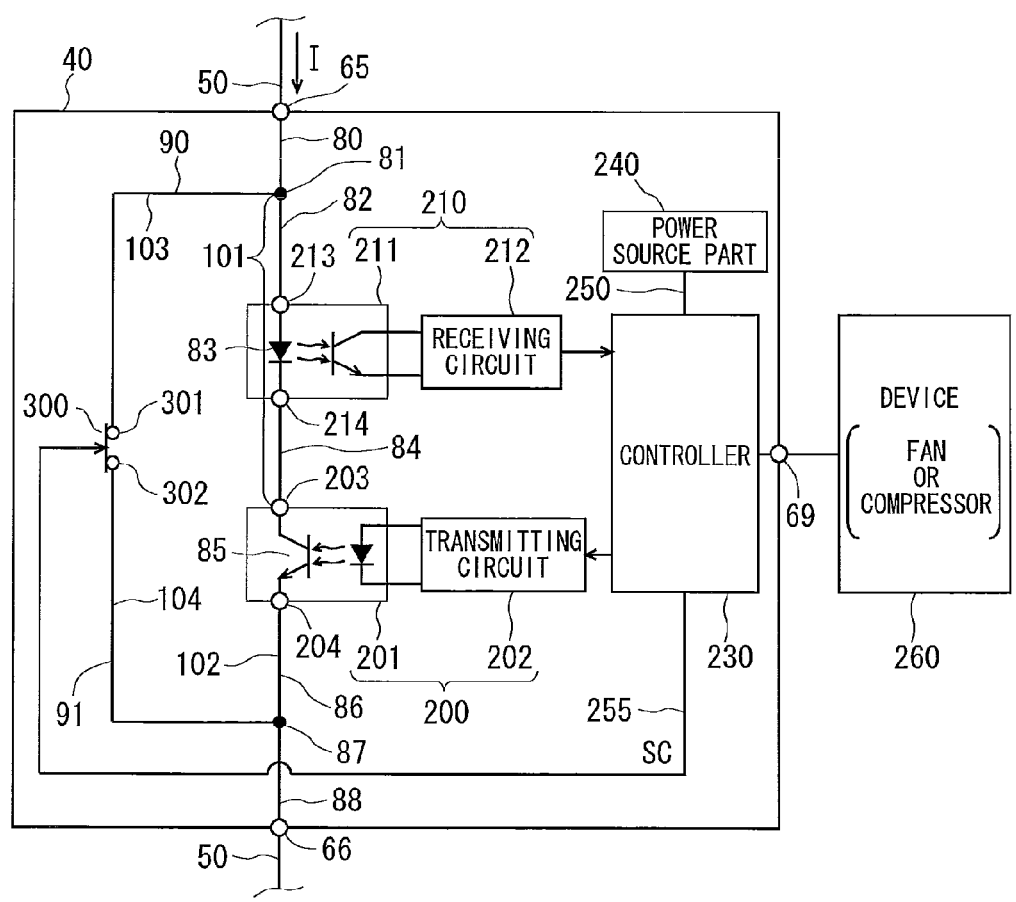

F I G. 7
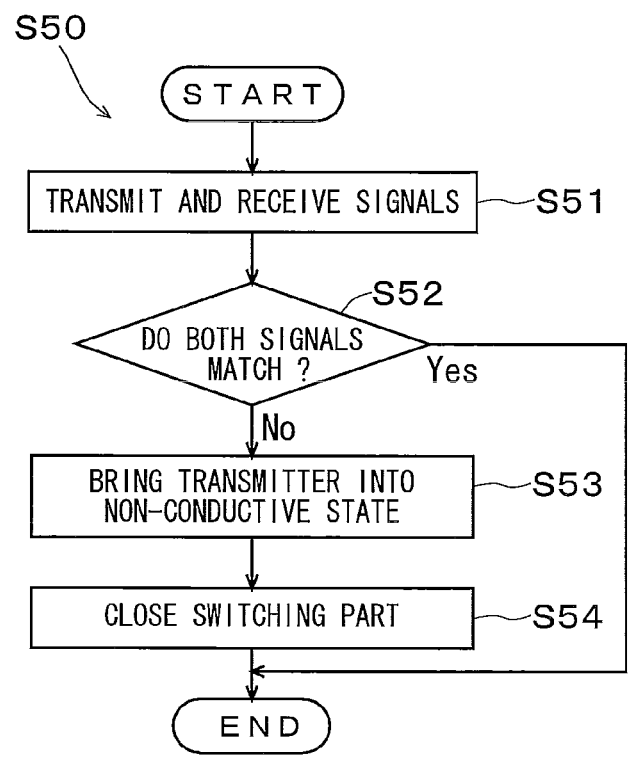

F I G . 9
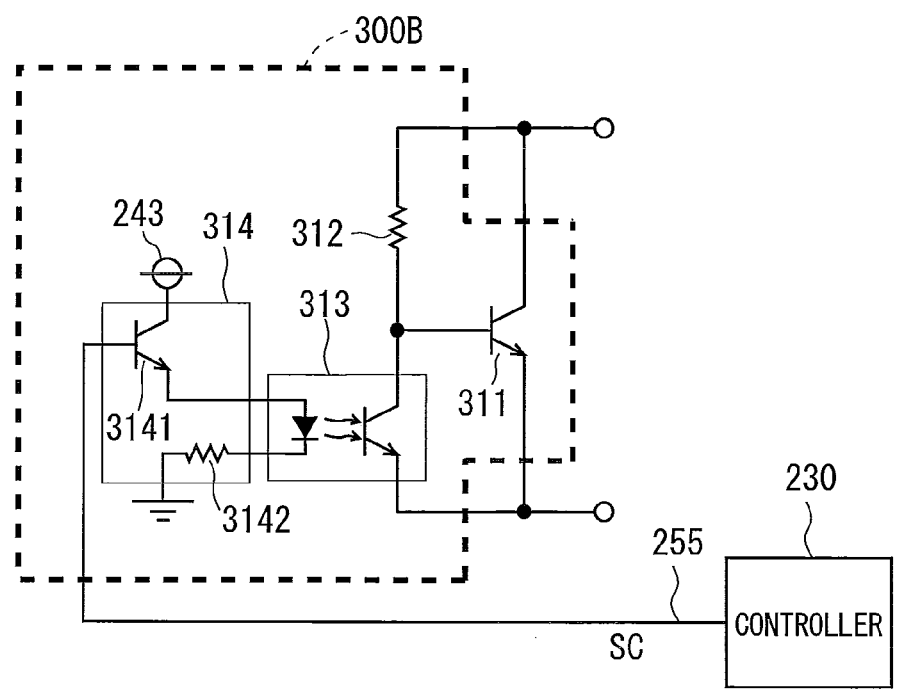

F I G . 1 0
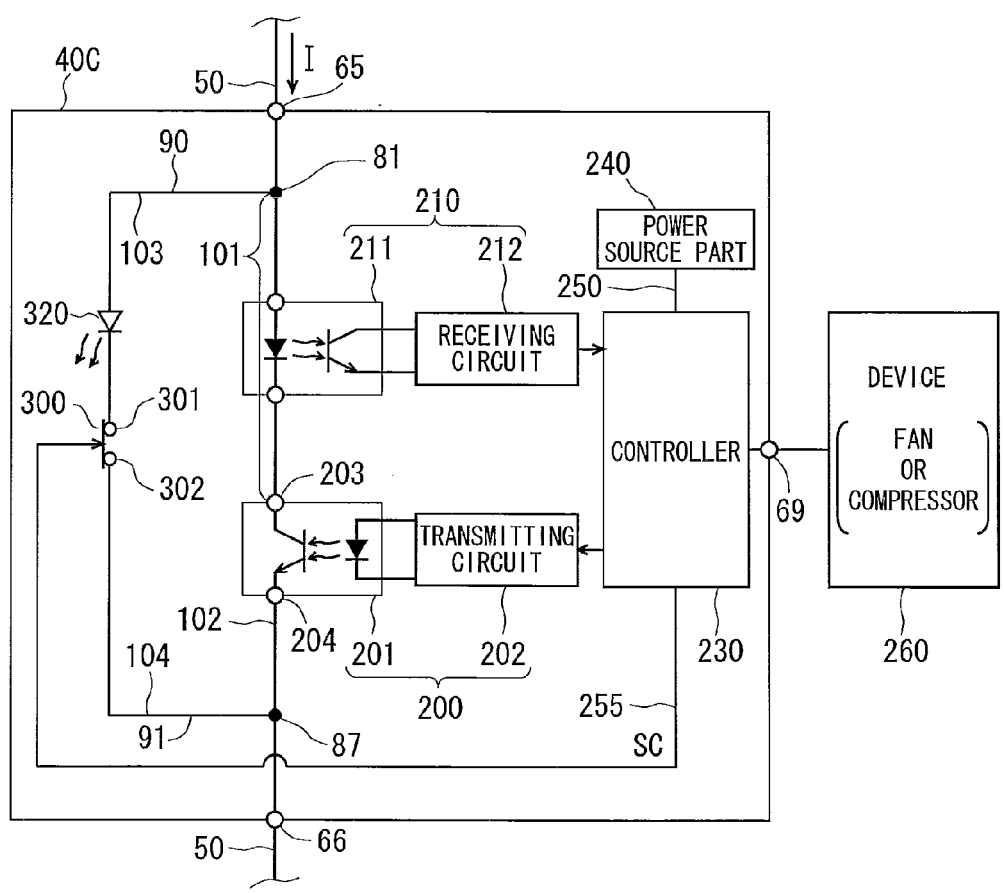

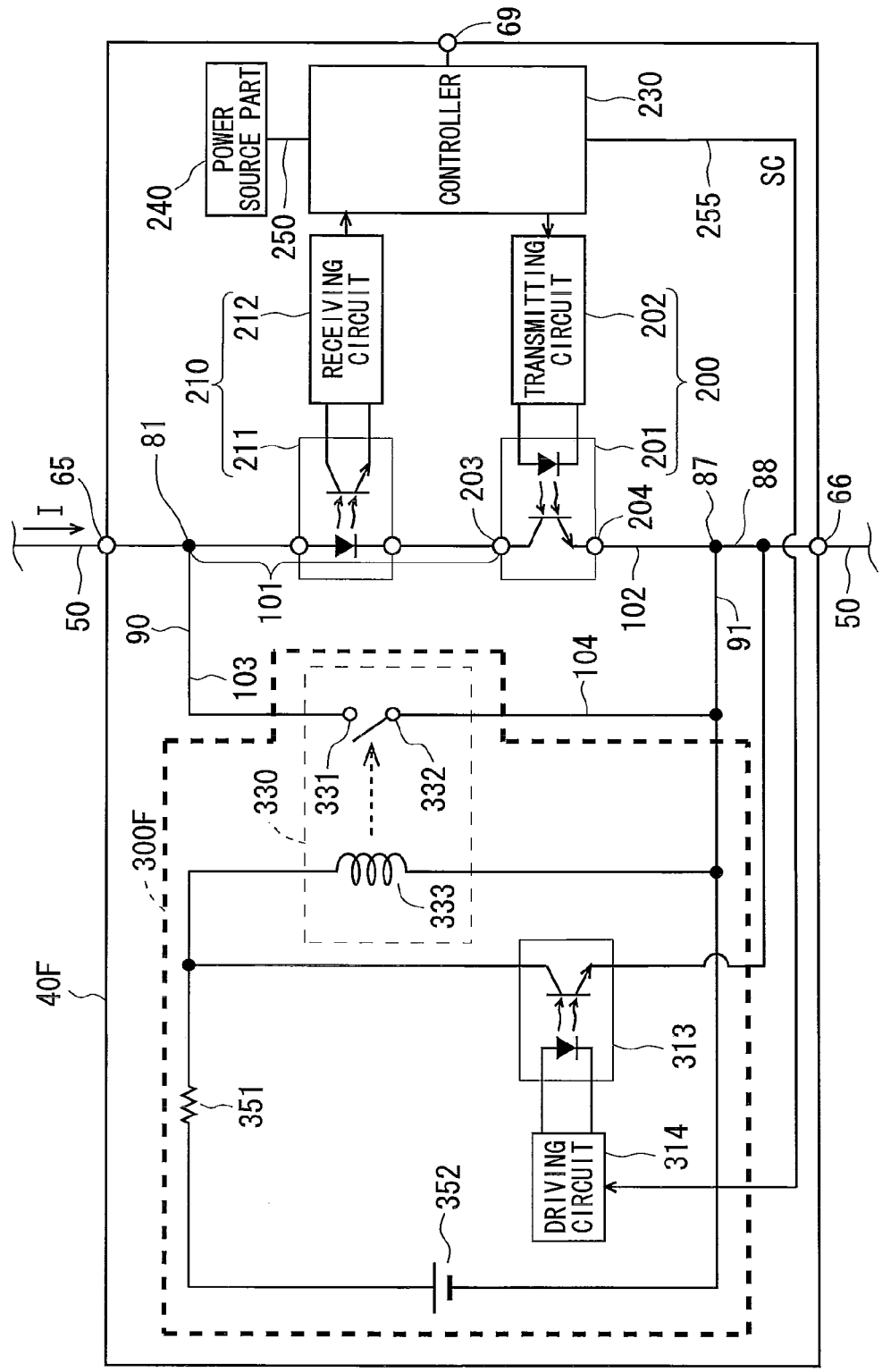
F I G. 13

F I G . 1 5
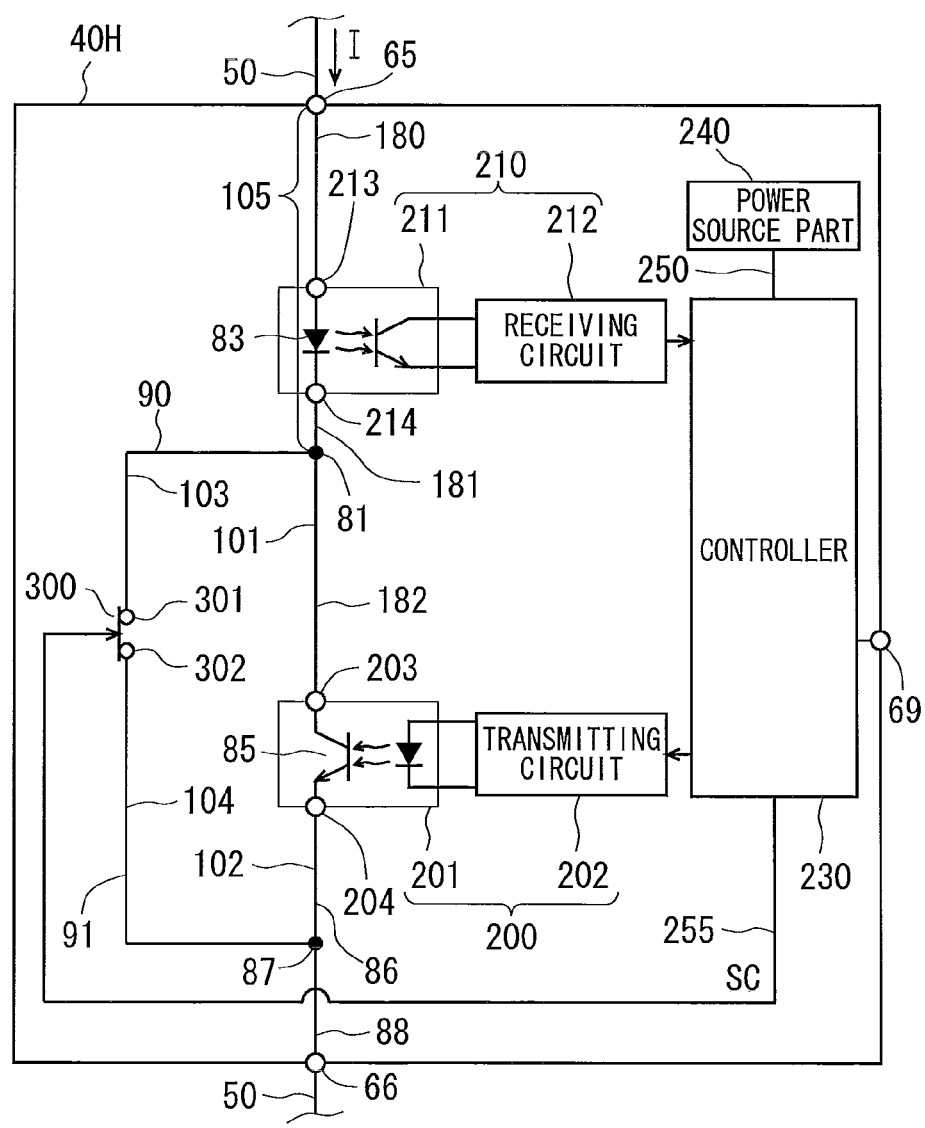

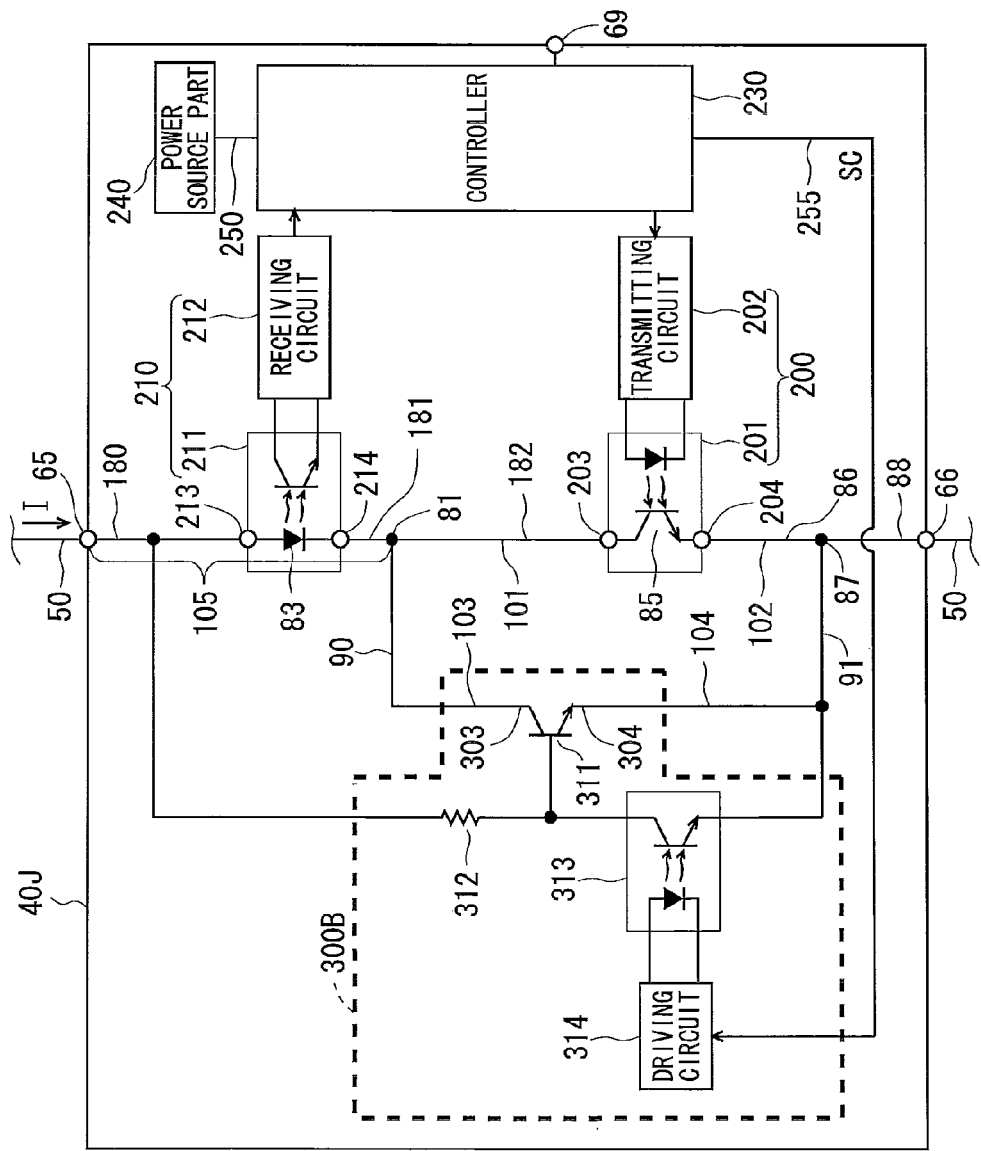
F I G. 17

F I G . 2 2
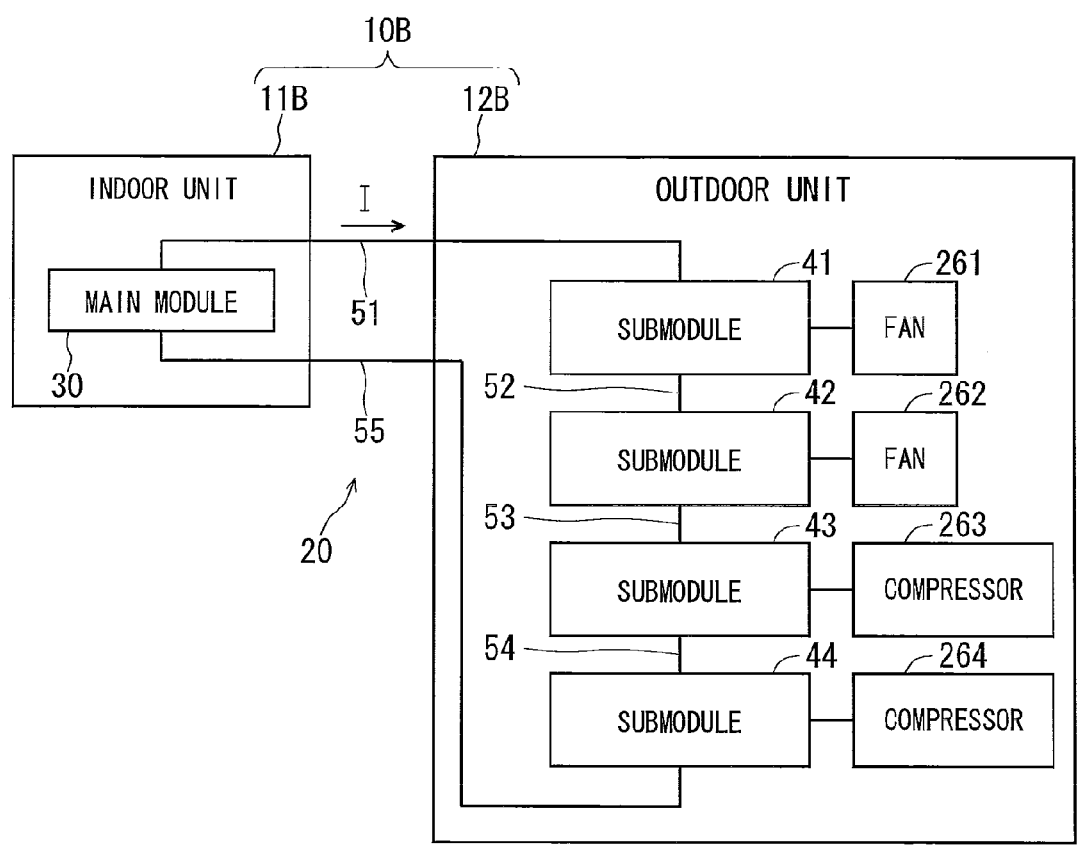

COMMUNICATION MODULE, COMMUNICATION SYSTEM AND AIR CONDITIONER

TECHNICAL FIELD

The present invention relates to a communication module, a communication system, and an air conditioner.

BACKGROUND ART

As disclosed in, for example, Japanese Patent Application Laid-Open No. 59-228451 and Japanese Patent Application Laid-Open No. 2002-213803, a communication system of a so-called current loop method is conventionally known. With communication using the current loop method (hereinafter also "current loop communication"), a plurality of communication modules are provided in a loop communication line and each module changes the current flowing in the communication line to generate a transmission signal.

Each communication module has a phototransistor (phototransistor in a photocoupler) inserted in the communication line, and performs open/close control of the phototransistor to intermit a loop current, thereby generates a signal (current signal) utilizing the above change of the current.

SUMMARY OF THE INVENTION

Problem to be Solved by the Invention

With a configuration where a plurality of communication modules are provided in one communication line, when a trouble occurs in any one of communication modules and the above phototransistor remains in the opened state, disconnection of the communication line continues, which results in disabling communication of the other communication modules.

It is an object of the present invention to provide a communication module which can prevent disconnection of a communication line even when a trouble occurs, a communication system to which the communication module is applied, and an air conditioner to which the communication system is applied.

Means for Solving the Problem

A first aspect of a communication module according to the present invention includes first and second signal line connection terminals (65, 66), a first current path (101) having one end (81) electrically connected to the first signal line connection terminal, a second current path (102) having one end (87) electrically connected to the second signal line connection terminal, a transmitter (200) which sends a signal utilizing a change of a current by changing the current flowing between the other end (203) of the first current path and the other end (204) of the second current path, a third current path (103) having one end (81) connected to the one end of the first current path, a fourth current path (104) having one end (87) connected to the one end of the second current path, a switching part (300; 300B; 300E; 300F; 300G) which switches a conductive/non-conductive state between the other end (301; 303; 331) of the third current path and the other end (302; 304; 332) of the fourth current path, a power source part (240) provided without being electrically connected with the first and second signal line connection terminals, and a controller (230) which is connected to the transmitter, the switching part and the power source part, and which operates with supply of power from the power source part, and which controls the transmitter and the switching part, wherein while the switching part brings about the non-conductive state between the other end of the third current path and the other end of the fourth current path by being applied with a control signal (SC) from the controller, the switching part brings about the conductive state between the other end of the third current path and the other end of the fourth current path by not being applied the control signal.

A second aspect of the communication module according to the present invention provides the first aspect, further including a notifying part (320) which notifies that a current flows in the third or fourth current path.

A third aspect of the communication module according to the present invention provides the first or second aspect, wherein the controller stops outputting the control signal when an interruption to stop communication is acquired from an outside of the module.

A fourth aspect of the communication module according to the present invention provides any one of the first to third aspects, further including a receiver (210) which receives a signal by detecting a current flowing in the first or second current path.

A fifth aspect of the communication module according to the present invention provides any one of the first to third aspects, further including a fifth current path (105) which is provided as a current path for connecting the first signal line connection terminal and the one end of the first current path or a current path for connecting the second signal line connection terminal and the one end of the second current path, and a receiver (210) which receives a signal by detecting a current flowing in the fifth current path.

A sixth aspect of the communication module according to the present invention provides the fourth or fifth aspect, wherein the controller is connected to the receiver, and performs reception through the receiver in parallel to transmission performed through the transmitter, and stops outputting the control signal when determining that the transmitted signal and the received signal do not match.

An aspect of a communication system according to the present invention includes a plurality of communication modules (41 to 44) each identical with the communication module of any one of the first to sixth aspects, wherein the plurality of communication modules are connected in series by electrically connecting the second signal line connection terminal of one of the communication modules to the first signal line connection terminal of the different communication module sequentially.

A first aspect of an air conditioner according to the present invention includes a communication system of the aspect and a plurality of devices (261 to 264) which are each connected to one of the plurality of communication modules and each operate utilizing communication through the communication modules, wherein the plurality of devices each include at least one of a compressor (263, 264) which compresses gaseous refrigerant, and a fan (261, 262) which blows air to a heat exchanger in which the refrigerant flows.

A second aspect of the air conditioner according to the present invention provides the air conditioner of the first aspect, wherein the plurality of devices include a plurality of devices (261, 262; 263, 264) of the same type.

Effect of the Invention

With the first aspect of the communication module according to the present invention, when, for example, the controller cannot output the control signal or when the controller does not output the control signal according to a predetermined operation, the third current path and the fourth current path are conducted through the switching part. Consequently, even when the non-conductive state is formed between the first current path and the second current path because, for example, the transmitter cannot be used or is not used, it is possible to prevent disconnection of the communication line.

With the second aspect of the communication module according to the present invention, it is possible to easily find that the switching part is in the conductive state. Consequently, it is possible to quickly start, for example, repair works.

With the third aspect of the communication module according to the present invention, when an interruption to stop communication occurs, the conductive state is formed between the other end of the third current path and the other end of the fourth current path. Consequently, it is possible to prevent, for example, signals of wrong contents resulting from failure, from being generated and transmitted.

With the fourth aspect of the communication module according to the present invention, it is possible to provide a module which can not only transmit but also receive signals using the same signal line connection terminals, that is, using the same signal lines. Consequently, it is possible to simplify a configuration and reduce cost compared to a configuration where signal line connection terminals and the signal lines are separately provided for transmission and reception.

With the fifth aspect of the communication module according to the present invention, it is possible to provide a module which can not only transmit but also receive signals using the same signal line connection terminals, that is, using the same signal lines. Consequently, it is possible to simplify a configuration and reduce cost compared to a configuration where signal line connection terminals and the signal lines are separately provided for transmission and reception.

Further, with the fifth aspect, even when the conductive state is formed between the third current path and the fourth current path, the receiver can receive signals.

With the sixth aspect of the communication module according to the present invention, although the trouble in the transmitter or/and the receiver may cause mismatch between the transmission signal and the received signal, when this trouble occurs, the conductive state is formed between the other end of the third current path and the other end of the fourth current path. Consequently, it is possible to prevent disconnection of the communication line.

With the aspect of the communication system according to the present invention, when a trouble occurs in the part of modules in the system in which a plurality of communication modules are connected in series, it is possible to prevent communication of the rest of communication modules from being disabled.

With the first aspect of the air conditioner according to the present invention, even when the part of devices cannot perform communication due to, for example, the trouble of communication modules, it is possible to prevent communication of the rest of devices from being disabled.

With the second aspect of the air conditioner according to the present invention, even when the part of devices of the same type cannot perform communication due to, for example, the trouble of communication modules, the rest of devices of the same type can perform an emergency operation.

The object, characteristics, aspects and advantages of the present invention will become more apparent from the following detailed description and the accompanying drawings.

BRIEF DESCRIPTION OF THE DRAWINGS

FIG. 1 is a configuration diagram schematically illustrating an air conditioner according to a first embodiment;

FIG. 3 is a configuration diagram schematically illustrating a submodule of the communication system according to the first embodiment;

FIG. 7 is a flowchart schematically illustrating an operation example (self-diagnosis processing) of the submodule of the communication system according to the first embodiment;

FIG. 9 is a configuration diagram illustrating a photocoupler driving circuit of a switching part according to the second embodiment;

FIG. 10 is a configuration diagram schematically illustrating the first example of a submodule of a communication system according to a third embodiment;

FIG. 13 is a configuration diagram schematically illustrating a submodule according to a fifth embodiment;

FIG. 15 is a configuration diagram schematically illustrating a first example of a submodule according to a seventh embodiment;

FIG. 17 is a configuration diagram schematically illustrating a third example of the submodule according to the seventh embodiment;

FIG. 22 is a configuration diagram schematically illustrating an air conditioner according to modifications of the first to seventh embodiments.

MODE FOR CARRYING OUT THE INVENTION

First Embodiment

Configuration Example of Overall Communication System

Figure 2:
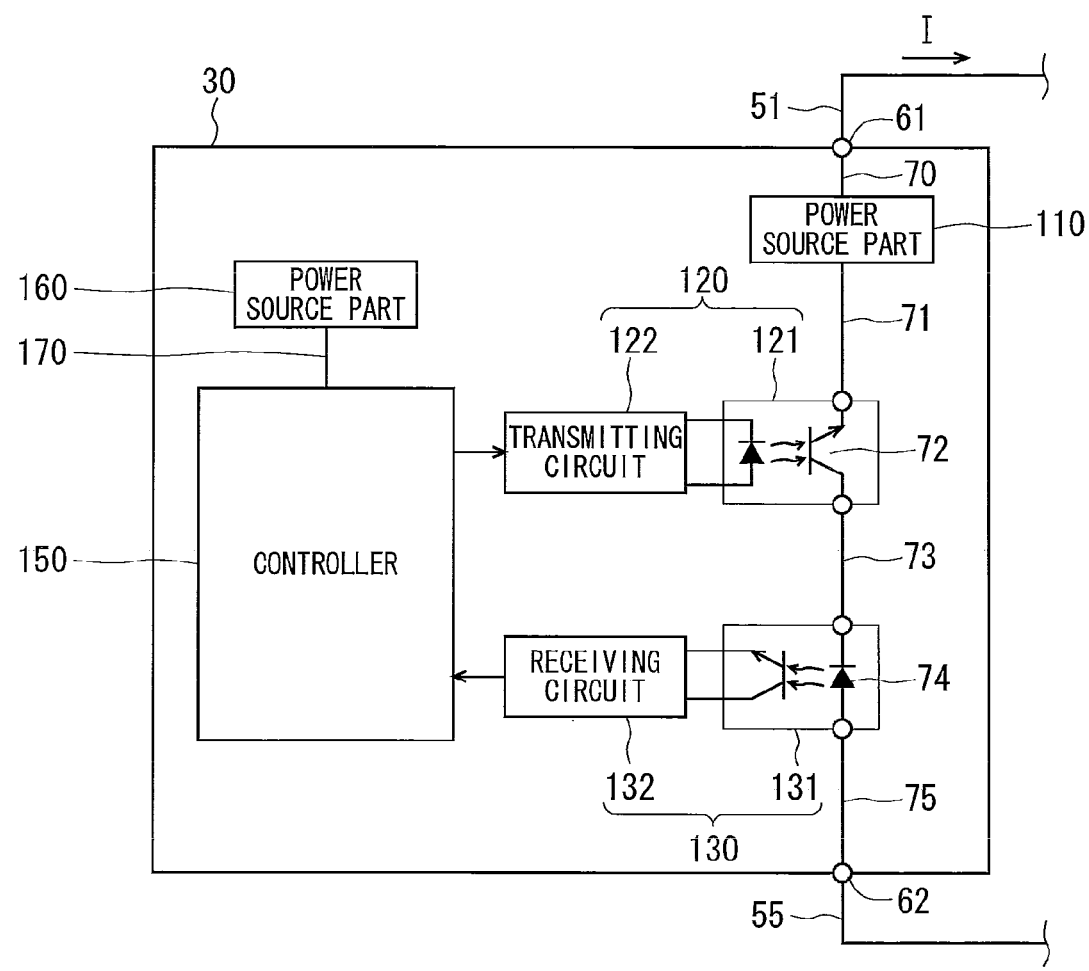
FIG. 2 is a configuration diagram schematically illustrating an example of a main module of a communication system according to the first embodiment.

FIG. 1 illustrates a configuration diagram schematically illustrating an example of an air conditioner according to a first embodiment. An air conditioner 10 illustrated in FIG. 1 has an indoor unit 11 and an outdoor unit 12, and the outdoor unit 12 has a communication system 20.

FIG. 1 illustrates, as the communication system 20, a communication system which adopts a so-called current loop method. A case will be described as an example here where the communication system 20 employs a configuration including one communication module 30 and four communication modules 41 to 44. Hereinafter, for ease of description, the communication module 30 will be also referred to as a main module 30 and the communication modules 41 to 44 will be also referred to as submodules 41 to 44. Note that, the numbers of the main module and submodules are not limited to the above example.

With the example of FIG. 1, the modules 30 and 41 to 44 are connected in a single loop. More specifically, with the example of FIG. 1, the main module 30 is connected to the submodule 41 through an electrical signal line (hereinafter simply referred to as a signal line) 51, and the submodule 41 is connected to the submodule 42 through a signal line 52. Further, the submodule 42 is connected to the submodule 43 through a signal line 53, and the submodule 43 is connected to the submodule 44 through a signal line 54. Furthermore, the submodule 44 is connected to the main module 30 through a signal line 55.

The communication system 20 transmits and receives information, that is, performs communication, utilizing the change of a loop current I flowing in a loop communication line or a current path having a configuration including the modules 30 and 41 to 44 and the signal lines 51 to 55 as described above. A specific example of a communication operation will be described later.

The main module 30 plays a core role in the communication system 20. For example, the main module 30 transmits and receives various pieces of information to and from the controller 13 of the indoor unit 11 (through a cable or by radio), and mediates transmission and reception of information between the controller 13 and the submodules 41 to 44. Further, the main module 30 performs, for example, predetermined processing based on information received from the controller 13 and the submodules 41 to 44.

The submodules 41 to 44 transmit and receive information to and from the main module 30. Note that, as is understood from the configuration which will be described as an example below, communication is possible between the submodules 41 to 44.

The submodules 41 to 44 are connected with predetermined devices 261 to 264, respectively, and the predetermined device 261 operates utilizing communication through the submodule 41 and, similarly, the predetermined devices 262 to 264 each operate utilizing communication through the submodules 42 to 44 connected with each device.

Here, fans provided in the outdoor unit 12 will be described as an example of devices 261 and 262, and compressors provided in the outdoor unit 12 will be described as an example of the devices 263 and 264. However, the devices 261 to 264 are not limited to these examples. Further, although, with the examples, the outdoor unit 12 has two fans 261 and 262 and two compressors 263 and 264, that is, a plurality of devices of the same type, the configuration of the outdoor unit 12 is not limited to this example. Further, all of devices 261 to 264 may be different types.

The compressors 263 and 264 are devices which compress gaseous refrigerant, and each have a compressor main body part and a controller which controls driving of this main body part. Further, the fans 261 and 262 are devices which blow air to a heat exchanger (not illustrated) in which the refrigerant flows, and here each have a fan main body part and a controller which controls driving of this main body part. In this case, the submodules 41 to 44 are connected to the above controllers of these devices 261 to 264, respectively, so that the devices 261 to 264 can operate utilizing the communication system 20 as described above.

<Configuration Example of Main Module>

FIG. 2 illustrates a configuration of the main module 30. Note that, in FIG. 2, connection with the indoor unit 11 illustrated in FIG. 1 is omitted. The main module 30 has a transmitter 120, a receiver 130, a controller 150, a power source part 160, and a wiring (power feeding line) 170.

The transmitter 120 is connected to the controller 150, and is an interface which allows the controller 150 to transmit signals to the signal lines 51 and 55. With the example of FIG. 2, the transmitter 120 has a photocoupler 121 and a transmitting circuit 122.

The photocoupler 121 has as an inputting part a light emitting diode which is an example of a light emitting element, and has as an outputting part a phototransistor 72 which is an example of a light receiving element.

The transmitting circuit 122 is connected to an anode terminal and a cathode terminal of the light emitting diode of the photocoupler 121, and the controller 150. The transmitting circuit 122 is a circuit which drives the light emitting diode of the photocoupler 121, and adjusts an amount of current flowing in the light emitting diode, in other words, an amount of light emission of the light emitting diode, based on the control signal from the controller 150. According to the amount of light emission of the light emitting diode, the amplitude of the current (collector current) flowing between a collector terminal and an emitter terminal of the phototransistor 72 is adjusted. With this configuration, the electrical signal utilizing the change of the current is sent from the transmitter 120 through the phototransistor 72.

The receiver 130 is connected to the controller 150, and is an interface which allows the controller 150 to receive signals from the signal lines 51 and 55. With the example of FIG. 2, the receiver 130 has a photocoupler 131 and a receiving circuit 132.

The photocoupler 131 has as an inputting part a light emitting diode 74 which is an example of a light emitting element, and has as an outputting part a phototransistor which is an example of a light receiving element. The receiving circuit 132 is connected to a collector terminal and an emitter terminal of the phototransistor of the photocoupler 131, and the controller 150.

In the photocoupler 131, an amount of light emission of the light emitting diode 74 changes according to an amount of current flowing between an anode terminal and a cathode terminal of the light emitting diode 74, and the amplitude of the current (collector current) flowing between the collector terminal and the emitter terminal of the phototransistor changes according to the amount of light emission. Hence, when a current signal is inputted to the light emitting diode 74, the current signal having the same change of the current as the input current signal is outputted from the phototransistor of the photocoupler 131. The receiving circuit 132 converts the current signal outputted from the photocoupler 131 into a signal of a format (here, voltage signal) which can be inputted to the controller 150, to output the converted signal to the controller 150. With this configuration, the current signal is received by the receiver 130 with the current detection by the light emitting diode 74, and is transmitted to the controller 150.

The controller 150 performs various processings and control in the main module 30. For example, the controller 150 generates a signal of a predetermined format (here, voltage signal) to output the signal to the transmitter 120, and performs various processings based on signals received through the receiver 130. Further, the controller 150 performs, for example, communication with the controller 13 of the indoor unit 11 (see FIG. 1).

The controller 150 is connected to the power source part 160 through the wiring 170. By this means, the controller 150 operates by receiving supply of power from the power source part 160 through the wiring 170. Here, the power source part 160 is not electrically connected to signal line connection terminals 61 and 62 which will be described later, and does not employ a configuration of acquiring, from the loop current I, power supplied to the controller 150.

A case will be described as an example here where the controller 150 employs a configuration including a microcomputer and a storage device, and this microcomputer executes various processing steps (in other words, steps) described in the program and controls, for example, the transmitter 120. Note that, voltage signals are generally used for input/output signals of microcomputers.

With the controller 150 employing this configuration, the microcomputer functions as various means which correspond to processing steps or realizes various functions which correspond to the processing steps. Note that, part or all of various means or various functions realized by the controller 150 may also be realized by hardware.

The above storage device of the controller 150 can be formed with one or a plurality of various storage devices such as a ROM (Read Only Memory), a RAM (Random Access Memory), a rewritable non-volatile memory (for example, EPROM (Erasable Programmable ROM)), and a hard disk device. This storage device stores various pieces of information, data, and the like, further stores programs to be executed by the controller 150, and further provides a work area for executing a program.

The main module 30 further has first and second signal line connection terminals 61 and 62, wirings (signal lines) 70, 71, 73 and 75, and a power source part 110.

The signal line connection terminals 61 and 62 are terminals connected with the signal lines 51 and 55 outside the module, respectively. With the example of FIG. 2, the terminal 61 is a terminal to which the loop current I flows out from the main module 30, and the terminal 62 is a terminal from which the loop current I flows into the main module 30.

One end of the wiring 70 is connected to the terminal 61, and the other end is connected to the power source part 110. One end of the wiring 71 is connected to the power source part 110, and the other end is connected to the emitter terminal of the phototransistor 72 of the transmitter 120. One end of the wiring 73 is connected to the collector terminal of the phototransistor 72, and the other end is connected to the cathode terminal of the light emitting diode 74 of the receiver 130. One end of the wiring 75 is connected to the anode terminal of the light emitting diode 74, and the other end is connected to the terminal 62.

With the above configuration, the wiring 70, the power source part 110, the wiring 71, the phototransistor 72, the wiring 73, the light emitting diode 74, and the wiring 75 form the current path between the terminals 61 and 62. In this current path, the loop current I is supplied from the power source part 110.

<Configuration Example of Submodule>

FIG. 3 illustrates a configuration of a submodule 40. The module 40 can be applied as the above submodules 41 to 44, and a case will be described as an example here where all of the submodules 41 to 44 employ the configuration of FIG. 3. Note that, a signal line 50 corresponds to the signal lines 51 to 55 in the example of FIG. 1.

The submodule 40 has a transmitter 200, a receiver 210, a controller 230, an external connection terminal 69, a power source part 240, and a wiring (power feeding line) 250.

The transmitter 200 is connected to the controller 230, and is an interface which allows the controller 230 to transmit signals to the signal line 50. With the example of FIG. 3, the transmitter 200 has a photocoupler 201 and a transmitting circuit 202. The photocoupler 201 has as an inputting part a light emitting diode which is an example of a light emitting element, and has as an outputting part a phototransistor 85 which is an example of a light receiving element.

The transmitting circuit 202 is connected to an anode terminal and a cathode terminal of the light emitting diode of the photocoupler 201, and the controller 230. The transmitting circuit 202 is a circuit which drives the light emitting diode of the photocoupler 201, and adjusts an amount of current flowing to the light emitting diode, in other words, an amount of light emission of the light emitting diode, based on a control signal from the controller 230. The amplitude of the current (collector current) flowing between a collector terminal 203 and an emitter terminal 204 of the phototransistor 85 is adjusted according to the amount of light emission of the light emitting diode. With this configuration, a current signal utilizing the change of the current is sent from the transmitter 200 through the phototransistor 85.

The receiver 210 is connected to the controller 230, and is an interface which allows the controller 230 to receive signals from the signal line 50. With the example of FIG. 3, the receiver 210 has a photocoupler 211 and a receiving circuit 212. The photocoupler 211 has as an inputting part a light emitting diode 83 which is an example of a light emitting element, and has as an outputting part a phototransistor which is an example of a light receiving element. The receiving circuit 212 is connected to a collector terminal and an emitter terminal of the phototransistor of the photocoupler 211, and the controller 230.

In the photocoupler 211, an amount of light emission of the light emitting diode 83 changes according to an amount of current flowing between an anode terminal 213 and a cathode terminal 214 of the light emitting diode 83, and the amplitude of the current (collector current) flowing between the collector terminal and the emitter terminal of the phototransistor changes according to the amount of light emission. Hence, when a current signal is inputted to the light emitting diode 83, a current signal having the same change of the current as the input current signal is outputted from the phototransistor of the photocoupler 211. The receiving circuit 212 converts the current signal outputted from the photocoupler 211 into a signal of a format (here, voltage signal) which can be inputted to the controller 230, to output the converted signal to the controller 230. With this configuration, the current signal is received by the receiver 210 with the current detection by the light emitting diode 83, and is transmitted to the controller 230.

The controller 230 performs various processing and control operations in the submodule 40. For example, the controller 230 generates a signal of a predetermined format (here, voltage signal) to output the signal to the transmitter 200, and performs various processing operations based on signals received through the receiver 210. When, for example, the device 260 is connected to the controller 230 through the external connection terminal 69 as illustrated in FIG. 3, the controller 230 acquires from the device 260 information related to the operation status of the device 260, and transmits the acquired information to the main module 30 through the transmitter 200. Further, the controller 230 transmits to the device 260 the signal received from the main module 30 through the receiver 210. Note that, any one of the above fans 261 and 262 and compressor 263 and 264 will be described as an example of the device 260.

The controller 230 is connected to the power source part 240 through the wiring 250. By this means, the controller 230 operates by receiving supply of power from the power source part 240 through the wiring 250. Here, the power source part 240 is not electrically connected to signal line connection terminals 65 and 66 which are described later, and does not employ a configuration of acquiring, from the loop current I, power supplied to the controller 230.

A case will be described an example here where the controller 230 employs a configuration including a microcomputer and a storage device, and this microcomputer executes various processing steps (in other words, steps) described in the program and controls, for example, the transmitter 200.

With the controller 230 employing this configuration, the microcomputer functions as various means which correspond to processing steps or realizes various functions which correspond to the processing steps. Note that, part or all of various means or various functions realized by the controller 230 may also be realized by hardware.

The above storage device of the controller 230 can be formed with one or a plurality of various storage devices such as a ROM, a RAM, a rewritable non-volatile memory (for example, EPROM), and hard disk device. This storage device stores various pieces of information, data, and the like, further stores programs to be executed by the controller 230, and further provides a work area for executing a program.

The controller 230 will be described further below.

The submodule 40 further has the first and second signal line connection terminals 65 and 66, wirings (signal lines) 80, 82, 84, 86, 88 and 255, and a switching part 300.

The signal line connection terminals 65 and 66 are terminals connected with the signal line 50 outside the module, respectively. With the example of FIG. 3, the terminal 65 is a terminal from which the loop current I flows into the submodule 40, and the terminal 66 is a terminal to which the loop current I flows out from the submodule 40.

Referring also to the example of FIG. 1, a terminal 66 of the submodule 41 is connected to a terminal 65 of the submodule 42 through the signal line 52, a terminal 66 of the submodule 42 is connected to a terminal 65 of the submodule 43 through the signal line 53, and a terminal 66 of the submodule 43 is connected to a terminal 65 of the submodule 44 through the signal line 54.

That is, the submodules 41 to 44 are connected in series by electrically connecting the terminal 66 of one of the submodules and the terminal 65 of different submodule sequentially. With the example of FIG. 1, the terminal 66 of the submodule 44 is connected to the terminal 65 of the submodule 41 through the signal line 55, main module 30, and signal line 51, so that the modules 30 and 41 to 44 are connected sequentially in a single loop.

One end of the wiring 80 is connected to the terminal 65, and the other end is connected to one end of the wiring 82. The other end of the wiring 82 is connected to the anode terminal 213 of the light emitting diode 83 of the receiver 210. One end of the wiring 84 is connected to the cathode terminal 214 of the light emitting diode 83, and the other end is connected to the collector terminal 203 of the phototransistor 85 of the transmitter 200. One end of the wiring 86 is connected to the emitter terminal 204 of the phototransistor 85, and the other end is connected to one end of the wiring 88. The other end of the wiring 88 is connected to the terminal 66.

One end of the wiring 90 is connected to a connection point 81 of the wirings 80 and 82. One end of the wiring 91 is connected to a connection point 87 of the wirings 86 and 88.

The switching part 300 is configured to control opening and closing between the other end 301 of the wiring 90 and the other end 301 of the wiring 91, that is, control switching between a non-conductive state and conductive state between the two end parts 301 and 302, and has a control terminal to which the control signal SC for this switching is inputted. The control terminal is connected to the controller 230 through the wiring 255, and, by this means, the conductive/non-conductive state between the end parts 301 and 302 is controlled by the controller 230.

When, for example, the controller 230 applies to the control terminal of the switching part 300 the control signal SC having a voltage with a voltage value other than 0 (zero), the switching part 300 brings about non-conductive state (opened state) between the end parts 301 and 302 of the wirings 90 and 91. By contrast with this, in a state where the above control signal SC is not applied from the controller 230 (also referred to as a signal unapplied state or a no signal state), the switching part 300 brings about the conductive state (closed state) between the end parts 301 and 302. That is, the switching part 300 is configured as a so-called normally-closed type.

Here, a case will be described as an example here where the switching part 300 is formed with a so-called contact b relay (see FIG. 3). In the case of the contact b relay, the above end parts 301 and 302 correspond to contact points, respectively, and the control signal SC for bringing the contact points 301 and 302 into the opened state corresponds to an exciting voltage.

With the above configuration, a current path (first current path) 101 is formed with the wiring 82, light emitting diode 83 and wiring 84 between the connection point 81 of the wirings 80 and 82 and the collector terminal 203 of the phototransistor 85. Further, a current path (second current path) 102 is formed with the wiring 86 between the emitter terminal 204 of the phototransistor 85 and connection point 87 of the wirings 86 and 88. Further, a current path (third current path) 103 is formed with the wiring 90 between the connection point 81 of the wirings 80 and 82 and the contact point 301 of the switching part 300. Further, a current path (fourth current path) 104 is formed with the wiring 91 between the contact point 302 of the switching part 300 and the connection point 87 of the wirings 86 and 88.

With the example of FIG. 3, the one end 81 of the first current path 101 (the same reference numeral as the corresponding connection point 81 is used for ease of description, and the same reference numeral representation method will be used for other elements) is connected indirectly to the terminal 65 through the wiring 80. By contrast with this, this one end 81 may be connected directly to the terminal 65. That is, as long as the one end 81 is electrically connected with the terminal 65, whether the connection mode of the both 81 and 65 is direct or indirect is not considered. Similarly, the one end 87 of the second current path may be indirectly connected to the terminal 66 through the wiring 88 as illustrated in FIG. 3, or may be directly connected to the terminal 66.

With the above configuration example, the current I flowing between the other end 203 of the first current path 101 and the other end 204 of the second current path 102 can be changed by the phototransistor 85 of the transmitter 200, so that a current signal utilizing the change of the current is sent to the outside of the module through the terminals 65 and 66.

Further, the one end 81 of the third current path 103 is connected to the one end 81 of the first current path 101, and the one end 87 of the fourth current path 104 is connected to the one end 87 of the second current path 102. Further, the switching part 300 switches the conductive/non-conductive state between the other end 301 of the third current path 103 and the other end 302 of the fourth current path 104. More specifically, the switching part 300 brings about the non-conductive state between the other end 301 of the third current path 103 and the other end 302 of the fourth current path 104 by being applied with the control signal SC from the controller 230. By contrast with this, the switching part 300 brings about the conductive state between the other ends 301 and 302 by not being applied the control signal SC.

Further, with the above configuration example, the light emitting diode 83 of the receiver 210 forms the first current path 101, and receives a signal by detecting the current I flowing in this path 101. As described above, the one end 81 of the first current path 101 is connected to the terminal 65 through the wiring 80, and the other end 203 is connected to the terminal 66 through the phototransistor 85 of the transmitter 200, second current path 102, and wiring 88. Hence, the submodule 40 transmits and receives signals using the same terminals 65 and 66, that is, the same signal line 50. Consequently, it is possible to simplify a configuration and reduce cost compared to a configuration where signal line connection terminals and external signal lines are separately provided for transmission and reception.

Note that, the receiver 210 may also employ a configuration where its light emitting diode 83 is inserted in the second current path 102 to detect the current I flowing in the path 102.

With the configuration examples of FIGS. 1 to 3, the communication line of the communication system 20 employs a configuration including the signal lines 51 to 55, the current path formed between the terminals 61 and 62 in the main module 30 and the current path formed between the terminals 65 and 66 in each of the submodules 41 to 44.

<Basic Operation Example of Communication System>

Figure 4:
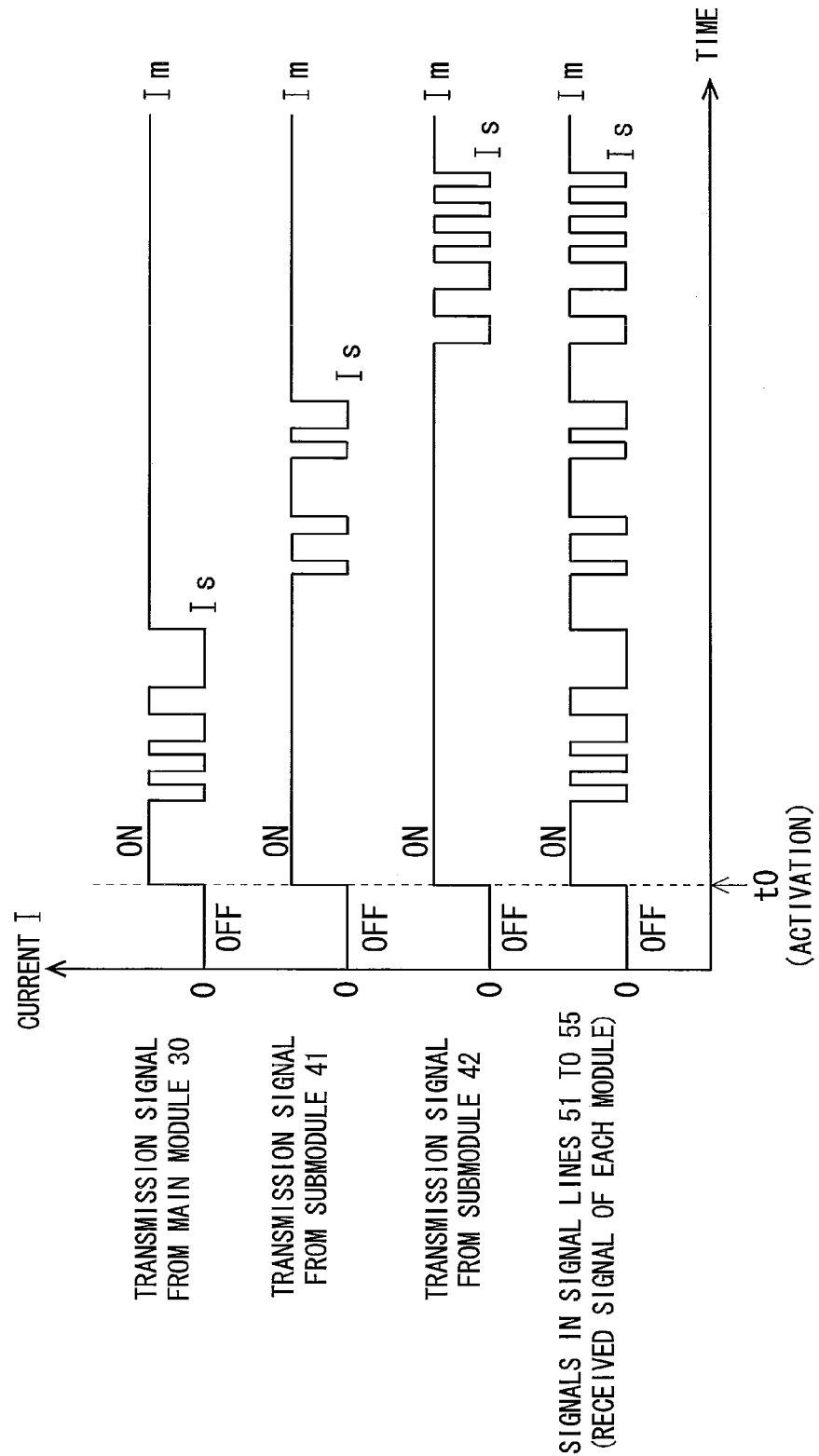
FIG. 4 is a timing chart schematically illustrating a basic operation of communication of the communication system according to the first embodiment.

FIG. 4 illustrates a timing chart schematically illustrating a basic operation of communication by the communication system 20. FIG. 4 illustrates current signals sent from the main module 30 and submodules 41 and 42, and current signals propagating in the signal lines 51 to 55 (in other words, current signals received by each of the modules 30 and 41 to 44). Meanwhile, a waveform of each current signal is not limited to the illustration of FIG. 4. Note that, although current signals sent from the submodules 43 and 44 are omitted in FIG. 4, they will be described in the same manner as the signals sent from the submodules 41 and 42.

The modules 30 and 41 to 44 generate current signals to be sent, by making the loop current I transition between different current values Im and Is. More specifically, the controllers 150 and 230 switch between the on state and the off state of the phototransistors 72 and 85 (see FIGS. 2 and 3) of the transmitters 120 and 200 based on transmission data. By this means, current pulse trains transitioning between the current values Im and Is (in other words, having the difference between the current values Im and Is as the amplitude) are sent from the terminals 61, 62, 65 and 66 as transmission signals.

With the example of FIG. 4, the current value Im is a current value produced when the phototransistors 72 and 85 of the transmitters 120 and 200 are in the on state, and here is a current value of the current supplied from the power source part 110 provided in the main module 30. By contrast with this, the current value Is is a current value produced when the phototransistors 72 and 85 of the transmitters 120 and 200 are in the off state, and is 0 (zero) here. Note that, the loop current I taking the current value Im is referred to as a mark current, and the loop current I taking the current value Is is referred to as a space current.

Note that, the current value Is may be set to, for example, a value other than 0 (zero). With this example, although the phototransistors 72 and 85 are in the on state (conductive state) in both cases of the current values Im and Is, different current values Im and Is can be generated. Further, the current value Im may be set to a value other than a value set by the power source part 110. Further, current signals may be generated using not only two values of the current values Im and Is, but also three or more current values.

With the illustration of FIG. 4, the transmission period of each of the modules 30 and 41 to 44 is shifted from each other, so that transmission signals from each of the modules 30 and 41 to 44 sequentially appear in these signal lines 51 to 55 without interfering each other. Note that, separation of transmission periods is employed in general current loop communication, and therefore detailed description thereof will be omitted here.

The current signals flowing in the signal lines 51 to 55 can be received by each of the modules 30 and 41 to 44. For example, each of the modules 30 and 41 to 44 receives by the receivers 130 and 210 all of the signals transmitted through the signal lines 51 to 55, and selectively acquires information related to each module by decoding in the controllers 150 and 230.

<Operation Example of Submodule: Processing Upon Activation>

Figure 5:
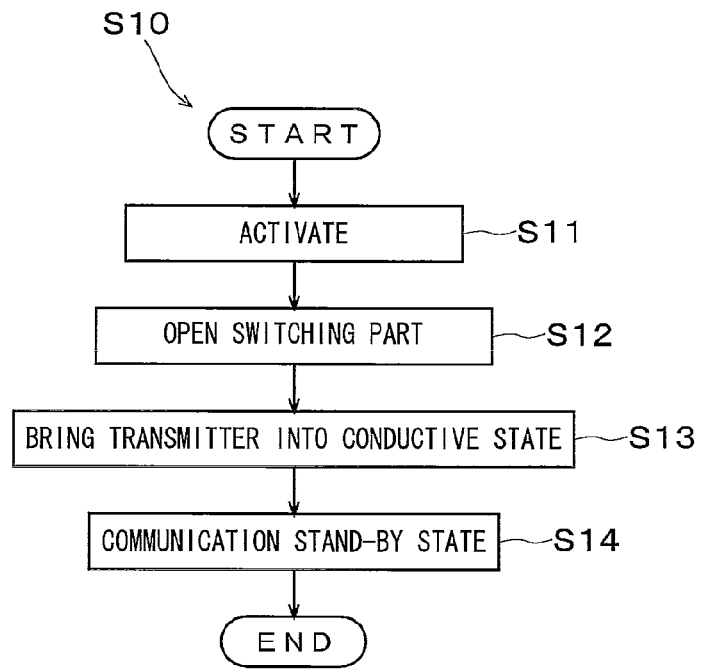
FIG. 5 is a flowchart schematically illustrating an operation example (processing upon activation) of the submodule of the communication system according to the first embodiment.

Referring also to the flowchart of FIG. 5, processing upon activation S10 will be described as an operation example of the submodule 40. The controller 230 of the submodule 40 is activated when, for example, power supply from the power source part 240 is started or the resetting operation is performed (step S11). Further, following the activation, the controller 230 performs processing S12 of bringing the switching part 300 (contact b relay 300) into the opened state and processing S13 of bringing the transmitter 200 into the conductive state. Meanwhile, any one of the processings S12 and S13 may be executed first.

More specifically, with processing S12, the controller 230 inputs the control signal SC (here, exciting voltage) to the control terminal of the contact b relay 300 to control the contact b relay 300 in the opened state. That is, the relay 300 does not receive the above control signal SC before the controller 230 is activated, and therefore this relay 300 in the closed state is brought into the opened state following activation of the controller 230. By this means, the state between the above other ends 301 and 302 of the third and fourth current paths 103 and 104 transitions from the conductive state to the non-conductive state.

Note that, the controller 230 basically keeps applying the above control signal SC and maintains the opened state of the relay 300 while the controller 230 is in an operation state, and, by this means, the non-conductive state between the current paths 103 and 104 continues.

In processing S13, the controller 230 controls the transmitting circuit 202 and energizes the light emitting diode of the photocoupler 201 to emit light from this light emitting diode and brings about the conductive state between the collector terminal 203 and the emitter terminal 204 of the phototransistor 85. That is, before the controller 230 is activated, the light emitting diode of the photocoupler 201 is not energized and in the non-light emitting state, and therefore the collector terminal 203 and the emitter terminal 204 of the phototransistor 85 are in the non-conductive state. This phototransistor 85 in the closed state is brought into the conductive state following activation of the controller 230. By this means, the state between the other ends 203 and 204 of the first and second current paths 101 and 102 transitions from the non-conductive state to the conductive state.

Figure 14:
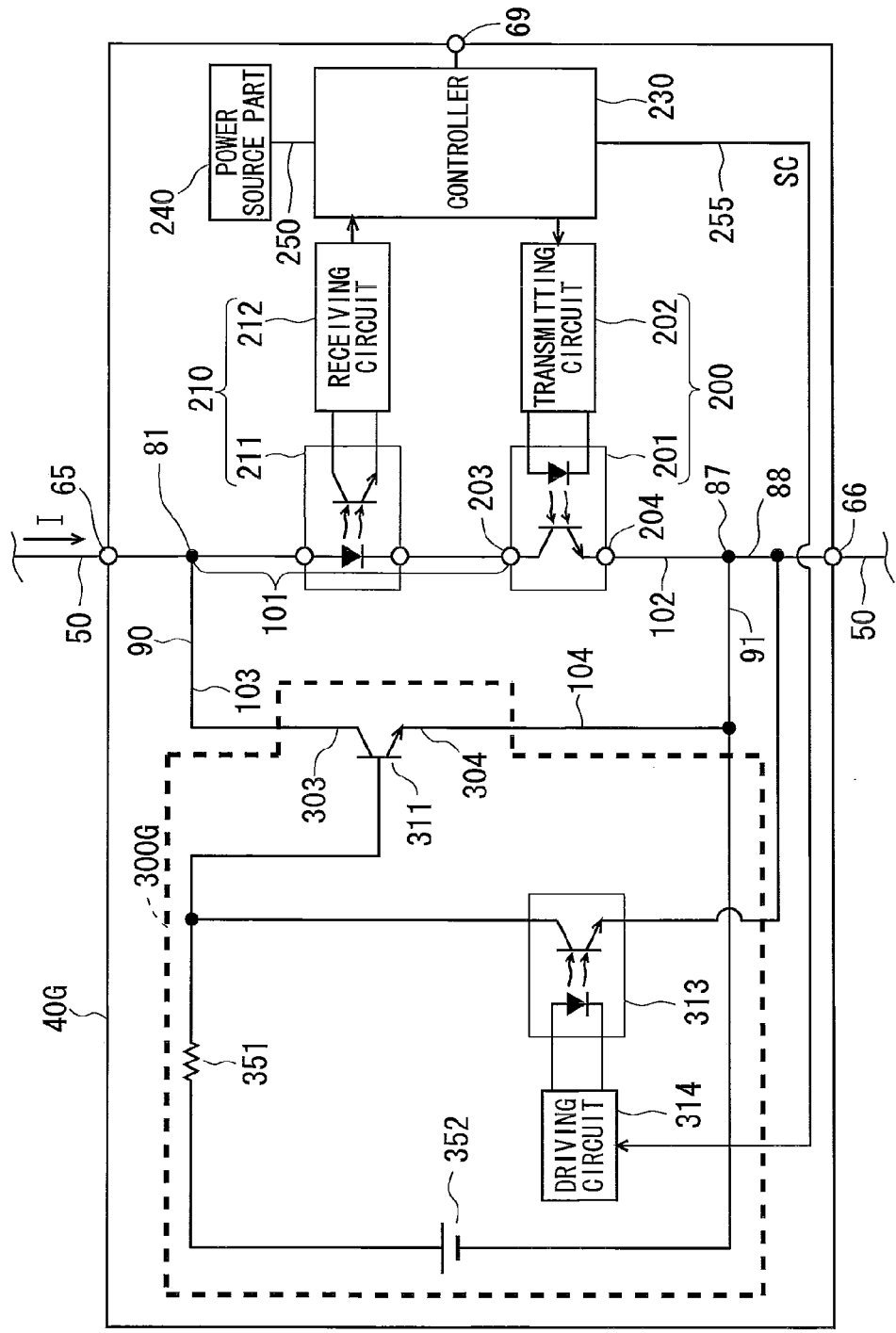
FIG. 14 is a configuration diagram schematically illustrating a submodule according to a sixth embodiment.

By executing processings S12 and S13, the transmitter 200 and receiver 210 are made available and the submodule 40 is brought into a communication stand-by state (see FIG. 14). Note that, the transition from the state before the controller 230 is activated to the communication stand-by state is illustrated as the state before and after the time t0 in the flowchart illustrated in FIG. 4.

According to processing upon activation S10, when the controller 230 is not normally activated, for example, when the controller 230 is itself out of order or when, for example, power is not fed normally from the power source part 240 to the controller 230, the non-conductive state between the first current path 101 and the second current path 102 continues. However, in this case, the state between the third current path 103 and the fourth current path 104 is in the conductive state by the contact b relay 300, and the signal line connection terminals 65 and 66 are conducted through the relay 300. Consequently, even when the controller 230 is not normally activated, it is possible to prevent disconnection of the current loop (communication line).

Further, the submodule 40 can provide the above effect of preventing disconnection not only when the controller 230 is activated but also even after the controller 230 is normally activated. More specifically, there is a case where, when, for example, a failure occurs in the controller 230 itself after the controller 230 is normally activated or when, for example, a trouble occurs in power supply from the power source part 240 to the controller 230, the controller 230 becomes inoperative. In this case, the transmitter 200 is not controlled by the controller 230, resulting in the non-conductive state between the first current path 101 and the second current path 102.

However, after the controller 230 becomes inoperative, the control signal SC is not outputted from the controller 230. By this means, the switching part 300 is brought into the closed state by not being applied the control signal SC. That is, the state between the third current path 103 and the fourth current path 104 is brought into the conductive state. Consequently, it is possible to prevent disconnection of the communication line.

A case has been described above where the controller 230 is brought into a state where the control signal SC cannot be outputted. By contrast with this, as will be described as an example below, it is also possible to provide an electrical connection between the third current path 103 and the fourth current path 104 by outputting no control signal SC from the controller 230 according to a predetermined operation.

<Operation Example of Submodule: Processing Upon Interruption>

Figure 6:
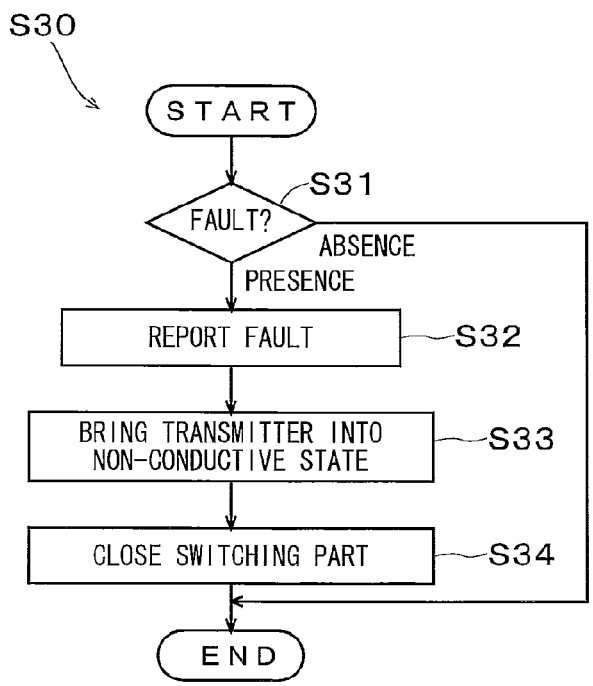
FIG. 6 is a flowchart schematically illustrating an operation example (interruption processing) of the submodule of the communication system according to the first embodiment.

FIG. 6 illustrates a flowchart of processing upon interruption S30 as an operation example of the submodule 40. A case will be described as an example here where the connection destination device 260 (see FIG. 3) finds a failure by executing failure diagnosis, and a signal for notifying that a failure occurs is transmitted to the submodule 40 as an interrupt signal. Note that, various common techniques can be adopted for failure diagnosis in the device 260, and therefore detailed description thereof will be omitted.

With processing upon interruption S30, when acquiring the interrupt signal from the device 260 (step S31), the controller 230 reports to the main module 30 or additionally to other submodules that a failure occurs and communication is stopped (step S32). Further, the controller 230 performs processing S33 of bringing the transmitter 200 into the non-conductive state and processing S34 of bringing the switching part 300 (contact b relay 300) into the closed state. Meanwhile, any one of the processings S33 and S34 may be executed first.

More specifically, with processing S33, the controller 230 controls the transmitting circuit 202 to stop energizing the light emitting diode of the photocoupler 201, thereby turns off the light emitting diode and brings about the non-conductive state between the collector terminal 203 and the emitter terminal 204 of the phototransistor 85. By this means, the state between the other ends 203 and 204 of the first and the second current paths 101 and 102 transitions from the conductive state to the non-conductive state.

With processing S34, the controller 230 stops applying the control signal SC to the contact b relay 300 to bring the contact b relay 300 into the opened state. By this means, the state between the above other ends 301 and 302 of the third and the fourth current paths 103 and 104 transitions from the non-conductive state to the conductive state.

Here, assume that, while receiving an interrupt signal from the device 260, the controller 230 continues stopping energizing the light emitting diode of the photocoupler 201 and stopping applying the control signal SC to the contact b relay 300. That is, when the device 260 is repaired and the interrupt signal is stopped, the controller 230 releases the above stopped energization and the stopped application of the control signal.

Note that, if there is no interrupt signal from the device 260 (see step S31), steps S32 to S34 are not executed (see FIG. 6). Further, processing upon interruption S30 may be employed without employing step S32.

Although a case has been described as an example above where the submodule 40 stops communication when receiving an interruption of a fault report from the device 260, the interruption to stop communication may be other factors.

The processing upon interruption S30 can prevent the controller 230 from generating and transmitting signals of wrong contents resulting from, for example, a fault of the device 260. Further, although there may be cases where, for example, the device 260 continues the operation according to a received signal from the main module 30 and the like, and worsens the state of fault, the processing upon interruption S30 can prevent this problem.

<Operation Example of Submodule: Self-Diagnosis Processing>

Hereinafter, another example will be described where the controller 230 stops outputting the control signal SC.

FIG. 7 illustrates a flowchart of diagnosis processing S50 of the communication function of the submodule 40 as an operation example of the submodule 40. This self-diagnosis processing S50 is based on the configuration of the submodule 40. That is, the transmission phototransistor 85 and the reception light emitting diode 83 are connected in series in the submodule 40 as illustrated in FIG. 3, so that the submodule 40 can receive in its receiver 210 signals sent from the transmitter 200. Hence, the communication function is diagnosed utilizing the fact that, when the transmitter 200 and the receiver 210 are normally operated, the signal received by the receiver 210 during the transmitting operation matches the transmission signal.

In self-diagnosis processing S50, the controller 230 performs reception through the receiver 210 in parallel with transmission performed through the transmitter 200 (step S51), and determines whether or not the transmitted signal and the received signal match (step S52).

When it is determined in step S52 that the both signals do not match, the controller 230 performs processing S53 of bringing the transmitter 200 into the non-conductive state and processing S54 of brining the switching part 300 (contact b relay 300) into the closed state. Meanwhile, any one of the processings S53 and 54 may be executed first. Note that, the processings S53 and 54 can be executed in the same manner as the processings S33 and S34 of the above processing upon interruption S30 (see FIG. 6), and therefore its description will be employed and overlapping description will be omitted.

When it is determined in step S52 that both signals match, the controller 230 finishes self-diagnosis processing S50 without executing the above processings S53 and S54.

Note that, self-diagnosis processing S50 may also be performed at any time, and, for example, may be performed on a regular basis utilizing the timer function of the controller 230 or, for example, may also be performed according to a command from the main module 30.

Although the trouble in the transmitter 200 and/or the receiver 210 may cause the above mismatch between the transmission signal and the received signal, even when such a trouble occurs, communication function self-diagnosis processing S50 can prevent disconnection of the current loop (communication line).

<Regarding Above Operation Example of Submodule>

In the part of the submodules 41 to 44, even if the controller 230 cannot output the control signal SC (for example, if the controller 230 cannot output the control signal SC when the controller 230 is activated or after the controller 230 is activated) or even if the controller 230 stops outputting the control signal SC according to a predetermined operation (for example, if an interruption to stop communication occurs, if communication is stopped due to a trouble in the transmitter 200 and/or the receiver 210), the above various processings S10, S30 and S50 can prevent even communication of the rest of submodules from being disabled. Consequently, in the outdoor unit 12 of the air conditioner 10 (see FIG. 1), even if the part of the devices 261 to 264 cannot perform communication, commutation of the rest of the devices is prevented from being disabled.

Further, the above outdoor unit 12 described as an example has the two fans 261 and 262, that is, a plurality of devices of the same type. Consequently, even when one of the fans 261 and 262 cannot perform communication in the communication system 20, it is possible to perform an emergency operation using the other one of the fans 261 and 262. As a result, it is possible to avoid that the outdoor unit 12 stops completely. The same applies to the two compressors 263 and 264.

Second Embodiment

Figure 8:
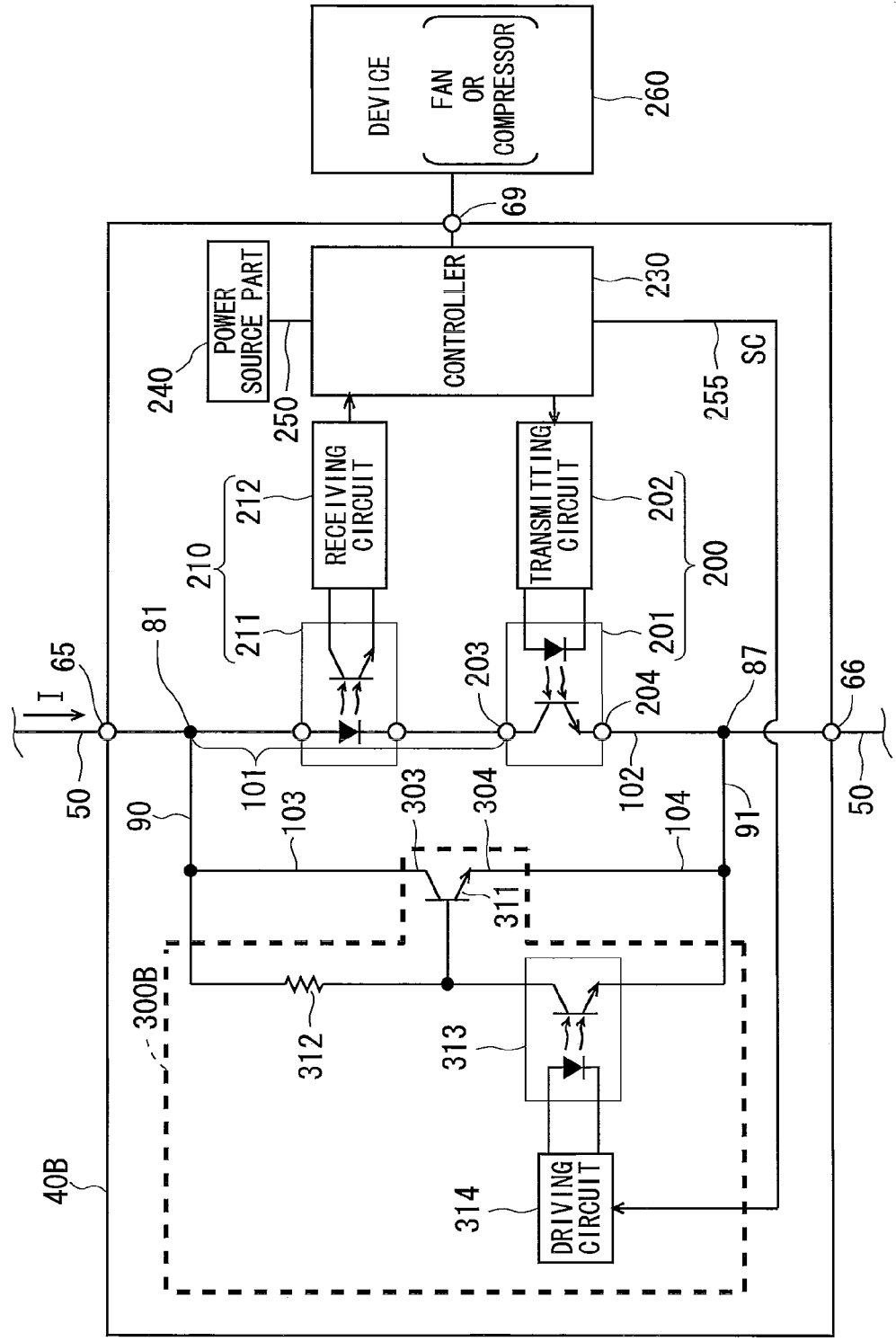
FIG. 8 is a configuration diagram schematically illustrating a submodule of a communication system according to a second embodiment.

Here, the submodule 40B illustrated in FIG. 8 may also be employed as the submodules 41 to 44 (see FIG. 1). Although a case has been described as an example where the switching part 300 is formed with the contact b relay of a single component in the above submodule 40 (see FIG. 3), the submodule 40B of FIG. 8 configures as a circuit the same function as the contact b relay. The submodule 40B illustrated in FIG. 8 employs the same configuration as the above submodule 40 except that the above switching part 300 is changed to the switching part 300B. Therefore, the switching part 300B will be mainly described.

The switching part 300B includes an NPN transistor 311, a resistance 312, a photocoupler 313 and a driving circuit 314 of the photocoupler 313. Note that, the photocoupler 313 has as an inputting part a light emitting diode which is an example of a light emitting element, and has as an outputting part a phototransistor which is an example of a light receiving element.

A collector terminal 303 of the transistor 311 is connected to the wiring 90 and an emitter terminal 304 is connected to the wiring 91. The base terminal of the transistor 311 is connected to the middle of the wiring 90 through the resistance 312, and thereby is electrically connected with the collector terminal 303.

Further, the base terminal of the transistor 311 is connected to the collector terminal of the phototransistor of the photocoupler 313. The emitter terminal of the phototransistor of the photocoupler 313 is connected to the middle of the wiring 91, and thereby is electrically connected to the emitter terminal 304 of the transistor 311. The anode terminal and the cathode terminal of the light emitting diode of the photocoupler 313 are connected to the driving circuit 314, and the driving circuit 314 is connected to the controller 230 through the wiring 255.

FIG. 9 illustrates a configuration example of the driving circuit 314. Note that, in FIG. 9, elements other than the driving circuit 314 are illustrated for ease of description.

With the example of FIG. 9, the driving circuit 314 has an NPN transistor 3141 and a resistance 3142. The collector terminal of the transistor 3141 is connected to a direct current power source 243, the base terminal is connected to the controller 230 and the emitter terminal is connected to the anode terminal of the light emitting diode of the photocoupler 313. One end of the resistance 3142 is connected to the cathode terminal of the light emitting diode of the photocoupler 313, and the other end is grounded.

Note that, the output power of the direct current power source 243 does not originate in the loop current I (see FIG. 8). In this regard, the direct current power source 243 and the power source part 240 are common (see FIG. 8).

According to the above configuration example, the current path (third current path) 103 which has the connection point 81 as one end and the collector terminal 303 of the transistor 311 as the other end is formed with the wiring 90, and the current path (fourth current path) 104 which has the connection point 87 as one end and the emitter terminal 304 of the transistor 311 as the other end is formed with the wiring 91.

In this case, the switching part 300B switches the conductive/non-conductive state between the other end 303 of the current path 103 and the other end 304 of the current path 104.

When, for example, the controller 230 applies to the driving circuit 314 the control signal SC having a voltage with a voltage value other than 0 (zero), the driving circuit 314 makes the light emitting diode of the photocoupler 313 emit light. This light emission brings the phototransistor of the photocoupler 313 into the conductive state, so that the voltage between the base and the emitter of the transistor 311 becomes 0 (zero) and the transistor is brought into the off state, that is, the opened state (non-conductive state). By contrast with this, in a state (no signal state) where the above control signal SC is not applied to the driving circuit 314 from the controller 230, the transistor 311 is brought into the on state, that is, the closed state (conductive state). That is, the switching part 300B is configured as a normally-closed type.

The submodule 40B having the switching part 300B can also provide the same effect as the above-described submodule 40 (see FIG. 3).

Third Embodiment

Figure 11:
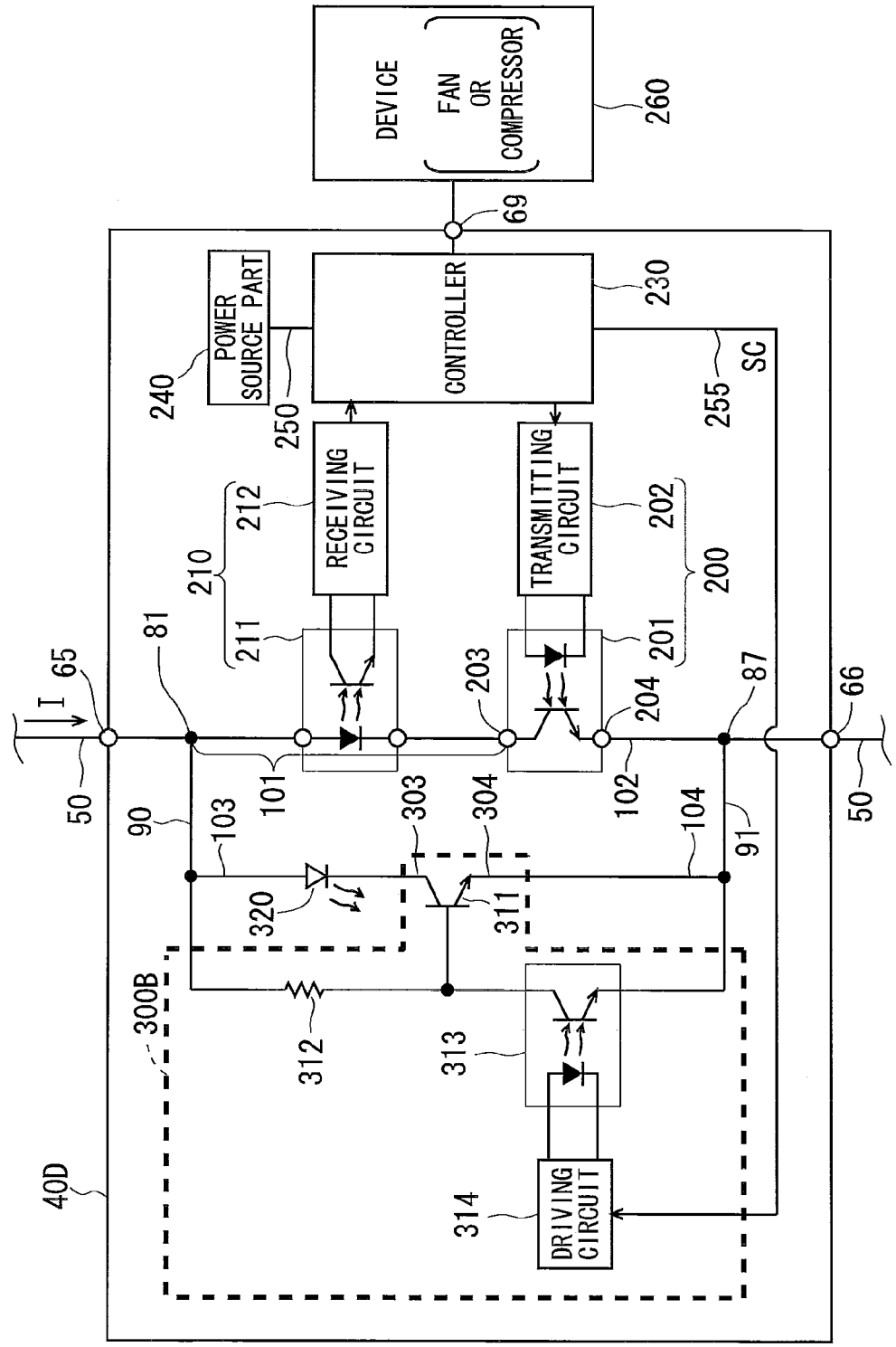
FIG. 11 is a configuration diagram schematically illustrating the second example of the submodule of the communication system according to the third embodiment.

The submodules 40C and 40D illustrated in FIGS. 10 and 11 may also be employed as the submodules 41 to 44 (see FIG. 1). The submodules 40C and 40D employ a configuration adding a notifying part 320 to the above submodules 40 and 40B (see FIGS. 3 and 8). Therefore, the notifying part 320 will be mainly described.

The notifying part 320 is an element which notifies that the current flows in the third current path 103, and cases are illustrated in FIGS. 10 and 11 where the notifying part 320 is formed with a light emitting diode.

With the examples of FIGS. 10 and 11, the light emitting diode 320 is inserted in the middle of the wiring 90, and the third current path 103 is formed with the wiring 90 and light emitting diode 320. With this configuration, when the switching parts 300 and 300B are brought into the conductive state, the current I flows in the third current path 103 and the light emitting diode 320 emits light. That is, light is emitted from the light emitting diode 320 to notify that the current I flows in the third current path 103. Consequently, it is possible to easily find that the switching parts 300 and 300B are in the conductive state and, for example, quickly start repair works.

The light emitting diode 320 may be inserted in, for example, the middle of the wiring 91. In this case, the fourth current path 104 is formed with the wiring 91 and light emitting diode 320, and the light emitting diode 320 notifies that the current flows in the fourth current path 104. Further, the light emitting diodes 320 may be provided both in the wirings 90 and 91.

Furthermore, the notifying part 320 may also be formed with an element or device other than light emitting diodes. For example, a displaying device which is configured to display a predetermined message when detecting that the current I flows in the third or the fourth current path 103 or 104, may also be applied to the notifying part 320. Note that, the light emitting diode can simply configure the notifying part 320 at low cost.

Further, the notifying part 320 is not limited to a configuration of making a visual notification such as light emission or display, and may be configured to make an audio notification such as an alarm or speech. Furthermore, the notifying part 320 may be formed by combining a plurality of elements, for example, by combining a light emitting diode and a buzzer.

Fourth Embodiment

Figure 12:
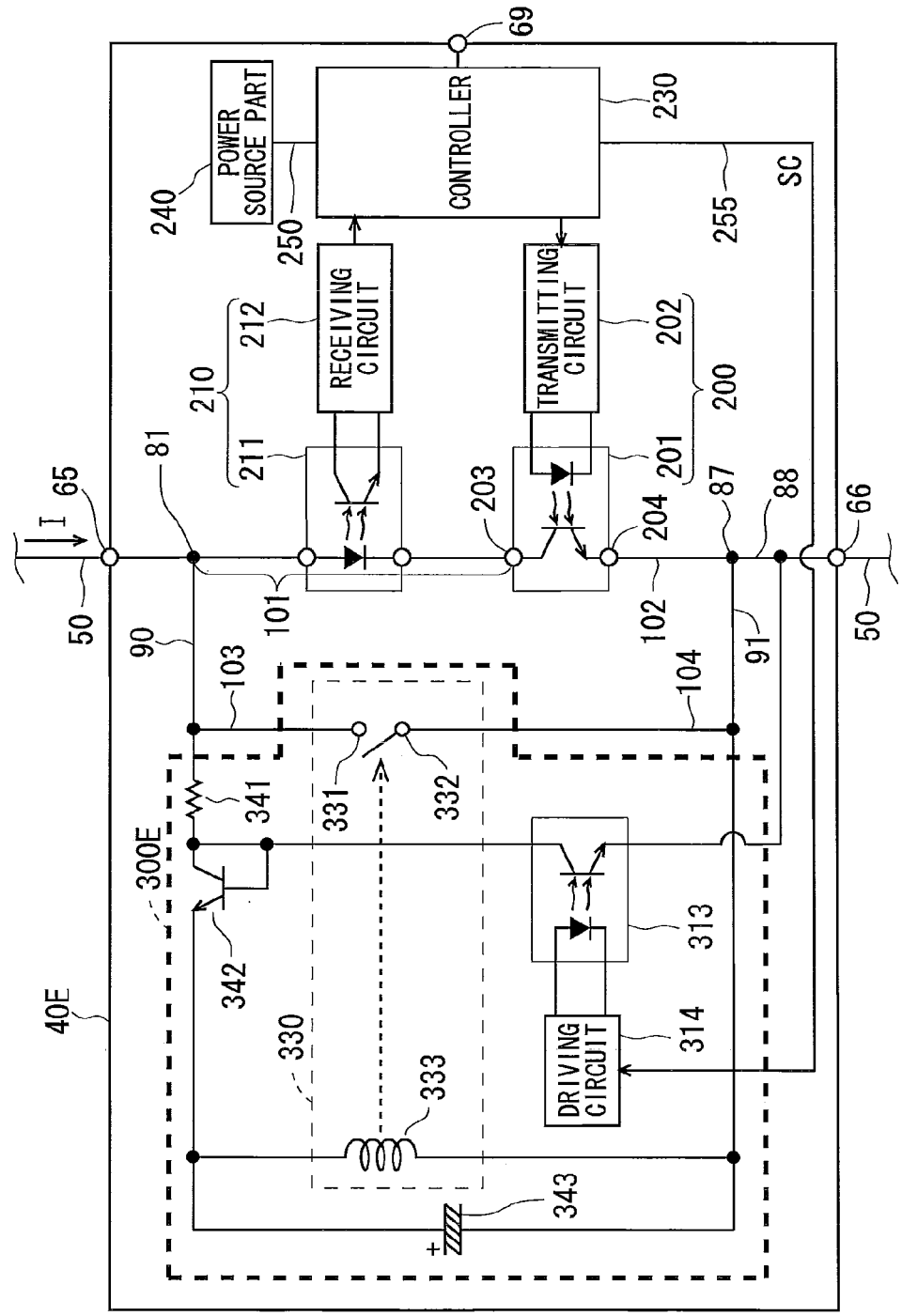
FIG. 12 is a configuration diagram schematically illustrating a submodule according to a fourth embodiment.

FIG. 12 illustrates a configuration of a submodule 40E according to a fourth embodiment. The submodule 40E can be employed as the submodules 41 to 44 of the communication system 20 (see FIG. 1). Note that, in FIG. 12, an accompanying illustration of the device 260 (see FIGS. 3 and 8) is omitted.

The submodule 40E illustrated in FIG. 12 employs the same configuration as the submodules 40 and 40B (see FIGS. 3 and 8) except that the switching parts 300 and 300B (see FIGS. 3 and 8) are changed to a switching part 300E. Therefore, the switching part 300E will be mainly described.

The switching part 300E has a relay 330, a resistance 341, an NPN transistor 342, an electrolytic capacitor 343, the photocoupler 313, and the driving circuit 314 of the photocoupler 313.

As schematically illustrated in FIG. 12, the relay 330 has contact points 331 and 332 and an exciting coil 333. The contact point 331 is connected to the above other end (the end part on the opposite side of the end part connected to the connection point 81) of the wiring 90 forming the third current path 103. The contact point 332 is connected to the above other end (the end part on the opposite side of the end part connected to the connection point 87) of the wiring 91 forming the fourth current path 104. The exciting coil 333 is connected to the electrolytic capacitor 343 in parallel.

Here, the relay 330 is formed with a so-called contact a relay. More specifically, in a state where the current does not flow in the exciting coil 333, the opened state (non-conductive state) is formed between the contact points 331 and 332. By contrast with this, in a state where the current flows in the exciting coil 333, the closed state (conductive state) is formed between the contact points 331 and 332.

One end of the resistance 341 is connected to the middle of the wiring 90, and the other end is connected to the collector terminal of the transistor 342. The collector terminal and the base terminal of the transistor 342 are connected to form a so-called diode structure. The collector terminal and the base terminal of the transistor 342 are connected to the collector terminal of the phototransistor of the photocoupler 313. The emitter terminal of the transistor 342 is connected to the positive electrode of the electrolytic capacitor 343. The negative electrode of the electrolytic capacitor 343 is connected to the middle of the wiring 91. Note that, as described above, the exciting coil 333 of the relay 300 is connected to the electrolytic capacitor 343 in parallel.

As described above, the collector terminal of the phototransistor of the photocoupler 313 is connected to the collector terminal and base terminal of the transistor 342 which adopts the diode structure. Further, the emitter terminal of the phototransistor is connected to the wiring 88. As described above, the wiring 88 is a wiring which connects the connection point 87 between the second current path 102 and the fourth current path 104, to the signal line connection terminal 66. The light emitting diode of the photocoupler 313 is connected to the driving circuit 314. The driving circuit 314 is connected to the controller 230 through the wiring 255.

A case will be described first as to the operation of the switching part 300E where the control signal SC is not applied from the controller 230. In this case, the driving circuit 314 does not drive the photocoupler 313 and therefore the phototransistor of the photocoupler 313 is brought into the non-conductive state. Therefore, the part of the loop current I flowing into a module from the signal line connection terminal 65 branches at the connection point 81 to the wiring 90, and flows into the electrolytic capacitor 343 through the resistance 341 and transistor 342. The electrolytic capacitor 343 functions as a direct current power source by accumulating charges. As a result, the coil 333 of the relay 330 is excited and the conductive state (closed state) is formed between the contact points 331 and 332. By this means, the conductive state is formed between the other end 331 of the third current path 103 and the other end 332 of the fourth current path 104.

By contrast with this, when the control signal SC is applied to the switching part 300E, the driving circuit 314 drives the photocoupler 313 to bring the phototransistor of the photocoupler 313 into the conductive state. Hence, the current branched at the connection point 81 and flowing into the wiring 90 flows to the wiring 88 through the resistance 314 and the phototransistor of the photocoupler 313. In this case, the electrolytic capacitor 343 does not accumulate charges. As a result, the coil 33 of the relay 330 is not excited, and the non-conductive state (opened state) is formed between the contact points 331 and 332. By this means, the non-conductive state is formed between the other end 331 of the third current path 103 and the other end 332 of the fourth current path 104.

Thus, the switching part 300E brings about the conductive state (closed state) between the current paths 103 and 104 when the control signal SC is not applied, and brings about the non-conductive state (opened state) between the current paths 103 and 104 when the control signal SC is applied. That is, the switching part 300E is configured as a normally-closed type.

The submodule 40E having the switching part 300E can also provide the same effect as the above-described submodule 40 (see FIG. 3) and the like.

Note that, the above-described notifying part 320 (see FIGS. 10 and 11) may also be added to the submodule 40E.

Fifth Embodiment

FIG. 13 illustrates a configuration of a submodule 40F according to a fifth embodiment. This submodule 40F can be employed as the submodules 41 to 44 of the communication system 20 (see FIG. 1). Note that, in FIG. 13, an accompanying illustration of the device 260 (see FIGS. 3 and 8) is omitted.

The submodule 40F illustrated in FIG. 13 employs the same configuration as the submodules 40, 40B and 40E (see FIGS. 3, 8 and 12) except that the switching parts 300, 300B and 300E (see FIGS. 3, 8 and 12) are changed to a switching part 300F. Therefore, the switching part 300F will be mainly described.

The switching part 300F has the relay 330, a resistance 351, a direct current power source 352, the photocoupler 313, and the driving circuit 314 of the photocoupler 313.

Here, similar to the above switching part 300E (see FIG. 12), the relay 330 is formed with a so-called contact a relay. The contact point 331 of the relay 330 is connected to the above other end (the end part on the opposite side of the end part connected to the connection point 81) of the wiring 90 forming the third current path 103. The contact point 332 of the relay 330 is connected to the above other end (the end part on the opposite 10, side of the end part connected to the connection point 87) of the wiring 91 forming the fourth current path 104.

One end of the exciting coil 333 of the relay 330 is connected to one end of the resistance 351, and the other end of this resistance 351 is connected to the positive electrode of the direct current power source 352. The other end of the exciting coil 333 is connected to the negative electrode of the direct current power source 352. Further, the above one end of the exciting coil 333 and the above one end of the resistance 351 are connected to the collector terminal of the phototransistor of the photocoupler 313. The above other end of the exciting coil 333 is connected to the middle of the wiring 91.

The direct current power source 352 can be formed with, for example, a battery. The output power of the direct current power source 352 does not originate in the loop current I. In this regard, the direct current power source 352 and the power source part 240 are common.

The collector terminal of the phototransistor of the photocoupler 313 is connected to the exciting coil 333 and the resistance 351 as described above. Further, the emitter terminal of this photo transistor is connected to the wiring 88. As described above, the wiring 88 is a wiring which connects the connection point 87 between the second current path 102 and fourth current path 104, to the signal line connection terminal 66. The light emitting diode of the photocoupler 313 is connected to the driving circuit 314. The driving circuit 314 is connected to the controller 230 through the wiring 255.

A case will be described first as to the operation of the switching part 300F where the control signal SC is not applied from the controller 230. In this case, the driving circuit 314 does not drive the photocoupler 313 and therefore the phototransistor of the photocoupler 313 is brought into the non-conductive state. In this case, the direct current power source 352 applies the current to the resistance 351 and exciting coil 333. As a result, the conductive state (closed state) is formed between the contact points 331 and 332 of the relay 330. By this means, the conductive state is formed between the other end 331 of the third current path 103 and the other end 332 of the fourth current path 104.

By contrast with this, when the control signal SC is applied to the switching part 300F, the driving circuit 314 drives the photocoupler 313 to bring phototransistor of the photocoupler 313 into the conductive state. Hence, the current flowing in the resistance 351 flows to the wiring 88 through the phototransistor of the photocoupler 313, and does not flow to the exciting coil 333. As a result, the coil 333 is not excited and the non-conductive state (opened state) is formed between the contact points 331 and 332. By this means, the non-conductive state is formed between the other end 331 of the third current path 103 and the other end 332 of the fourth current path 104.

Thus, the switching part 300F brings about the conductive state (closed state) between the current paths 103 and 104 when the control signal SC is not applied, and brings about the non-conductive state (opened state) between the current paths 103 and 104 when the control signal SC is applied. That is, the switching part 300F is configured as a normally-closed type.

The submodule 40F having the switching part 300F can also provide the same effect as the above-described submodule 40 (see FIG. 3) and the like.

Note that, the above-described notifying part 320 (see FIGS. 10 and 11) may also be added to the submodule 40F.

Sixth Embodiment

FIG. 14 illustrates a configuration of a submodule 40G according to a sixth embodiment. This submodule 40G can be employed as the submodules 41 to 44 of the communication system 20 (see FIG. 1). Note that, in FIG. 14, an accompanying illustration of the device 260 (see FIGS. 3 and 8) is omitted.

The submodule 40G illustrated in FIG. 14 employs the same configuration as the submodules 40, 40B, 40E and 40F (see FIGS. 3, 8, 12 and 13) except that the switching parts 300, 300B, 300E and 300F (see FIGS. 3, 8, 12 and 13) are changed to a switching part 300G. Therefore, the switching part 300G will be mainly described here.

The switching part 300G employs the same configuration as the switching part 300F (see FIG. 13) except that the relay 330 (see FIG. 13) is changed to the transistor 311 of the switching part 300B (see FIG. 8).

More specifically, the collector terminal 303 of the transistor 311 is connected to the above other end (the end part on the opposite side of the end part connected to the connection point 81) of the wiring 90 forming the third current path 103. Further, the emitter terminal 304 of the transistor 311 is connected to the above other end (end part on the opposite side of the end part connected to the connection point 87) of the wiring 91 forming the fourth current path 104. Further, the base terminal of the transistor 311 is connected to the above one end of the resistance 351 and the collector terminal of the phototransistor of the photocoupler 313.

A case will be described first as to the operation of the switching part 300G where the control signal SC is not applied from the controller 230. In this case, the driving circuit 314 does not drive the photocoupler 313 and therefore the phototransistor of the photocoupler 313 is brought into the non-conductive state. In this case, the current flows to the base terminal of the transistor 311 from the direct current power source 352 through the resistance 351, and the conductive state (closed state) is formed between the collector terminal 303 and emitter terminal 304 of the transistor 311. By this means, the conductive state is formed between the other end 303 of the third current path 103 and the other end 304 of the fourth current path 104.

By contrast with this, when the control signal SC is applied to the switching part 300G, the driving circuit 314 drives the photocoupler 313 to bring phototransistor of the photocoupler 313 into the conductive state. Hence, the current flowing in the resistance 351 flows to the wiring 88 through the phototransistor of the photocoupler 313. As a result, the current does not flow to the base terminal of the transistor 311, and the non-conductive state (opened state) is formed between the collector terminal 303 and the emitter terminal 304. By this means, the non-conductive state is formed between the other end 303 of the third current path 103 and the other end 304 of the fourth current path 104.

Thus, the switching part 300G brings about the conductive state (closed state) between the current paths 103 and 104 when the control signal SC is not applied, and brings about the non-conductive state (opened state) between the current paths 103 and 104 when the control signal SC is applied. That is, the switching part 300G is configured as a normally-closed type.

The submodule 40G having the switching part 300G can also provide the same effect as the above-described submodule 40 (see FIG. 3) and the like.

Note that, the above-described notifying part 320 (see FIGS. 10 and 11) may also be added to the submodule 40G.

Seventh Embodiment

The case has been described as an example with above the first to sixth embodiments where the third and fourth current paths 103 and 104 are provided stepping over the serial connection structure of the transmitter 200 and the receiver 210. By contrast with this, the third and the fourth current paths 103 and 104 may also be provided stepping over the transmitter 200 alone. This configuration example will be described with a seventh embodiment.

FIGS. 15 to 20 illustrate configurations of submodules 40H to 40M according to the first example to sixth example of the seventh embodiment. Each of the submodules 40H to 40M can be employed as the submodules 41 to 44 of the communication system 20 (see FIG. 1). Note that, in FIGS. 15 to 20, an accompanying illustration of the device 260 (see FIGS. 3 and 8) is omitted.

The submodule 40H illustrated in FIG. 15 employs a configuration where the connection destination of the above one end 81 of the wiring 90 is changed to the wiring 84 connecting the transmitter 200 and the receiver 210 in the submodule 40 illustrated in FIG. 3. Note that, the other configurations of the submodule 40H are the same as the submodule 40.

More specifically, with the example of FIG. 15, wirings 180 to 182 are provided instead of the wirings 80, 82 and 84 illustrated in FIG. 3. The wiring 180 connects the signal line connection terminal 65 and the anode terminal 213 of the light emitting diode 83 of the receiver 210. Further, the wiring 181 connects the cathode terminal 214 of the light emitting diode 83 of the receiver 210 and the above one end 81 of the wiring 90. Further, the wiring 182 connects the above one end 81 of the wiring 90 and the collector terminal 203 of the light emitting diode 85 of the transmitter 200.

Figure 16:
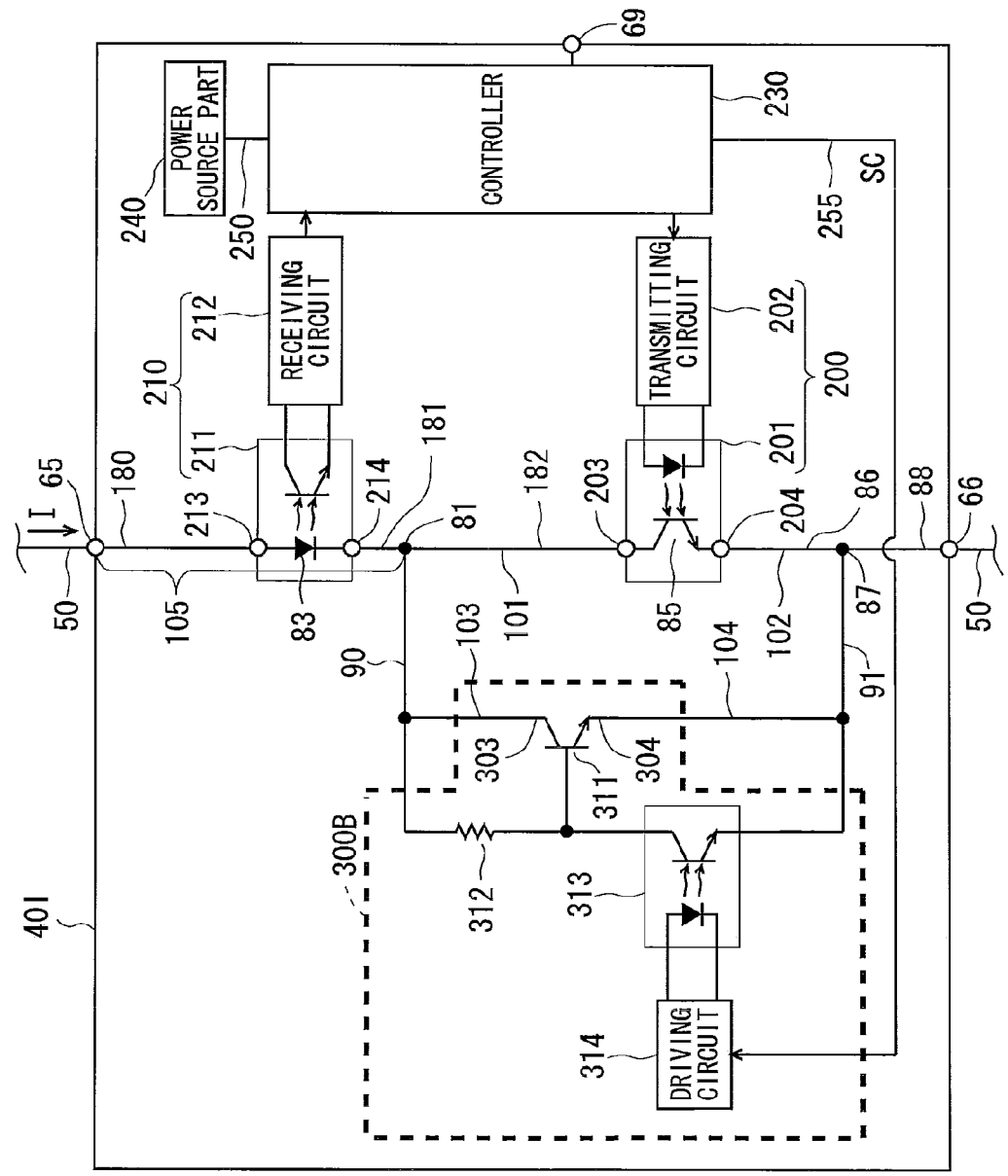
FIG. 16 is a configuration diagram schematically illustrating a second example of the submodule according to the seventh embodiment.

The submodule 40I illustrated in FIG. 16 employs a configuration where the switching part 300 is changed to the above-described switching part 300B in the submodule 40H illustrated in FIG. 15. In other words, the submodule 40I employs a configuration where the connection destination of the above one end 81 of the wiring 90 is changed to the wiring connecting the transmitter 200 and the receiver 210 in the submodule 40B illustrated in FIG. 8. Note that, the other configurations of the submodule 40I are the same as the submodules 40H and 40B.

Here, with the example of FIG. 16, the resistance 312 connects the base terminal of the transistor 311 and the wiring 90. By contrast with this, similar to the submodule 40J illustrated in FIG. 17, the resistance 312 may be provided connecting the base terminal of the transistor 311 and the wiring 180. Note that, with the example of FIG. 17, the other configurations of the submodule 40J are the same as the submodule 40I illustrated in FIG. 16.

Figure 18:
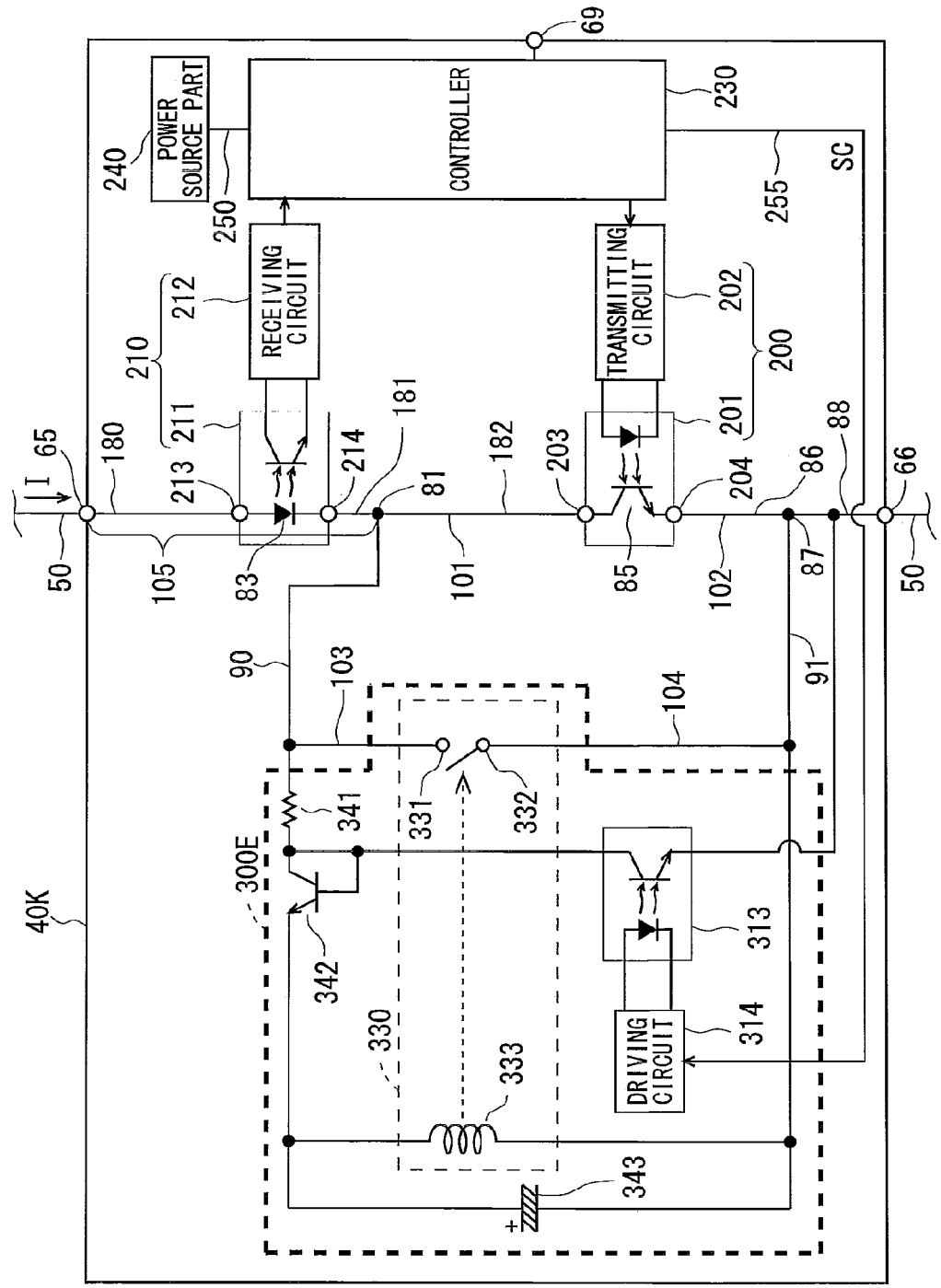
FIG. 18 is a configuration diagram schematically illustrating a fourth example of the submodule according to the seventh embodiment.

The submodule 40K illustrated in FIG. 18 employs a configuration where the switching part 300 is changed to the above-described switching part 300E in the submodule 40H illustrated in FIG. 15. In other words, the submodule 40K employs a configuration where the connection destination of the above one end 81 of the wiring 90 is changed to the wiring connecting the transmitter 200 and the receiver 210 in the submodule 40E illustrated in FIG. 12. Note that, the other configurations of the submodule 40K are the same as the submodules 40H and 40E.

Figure 19:
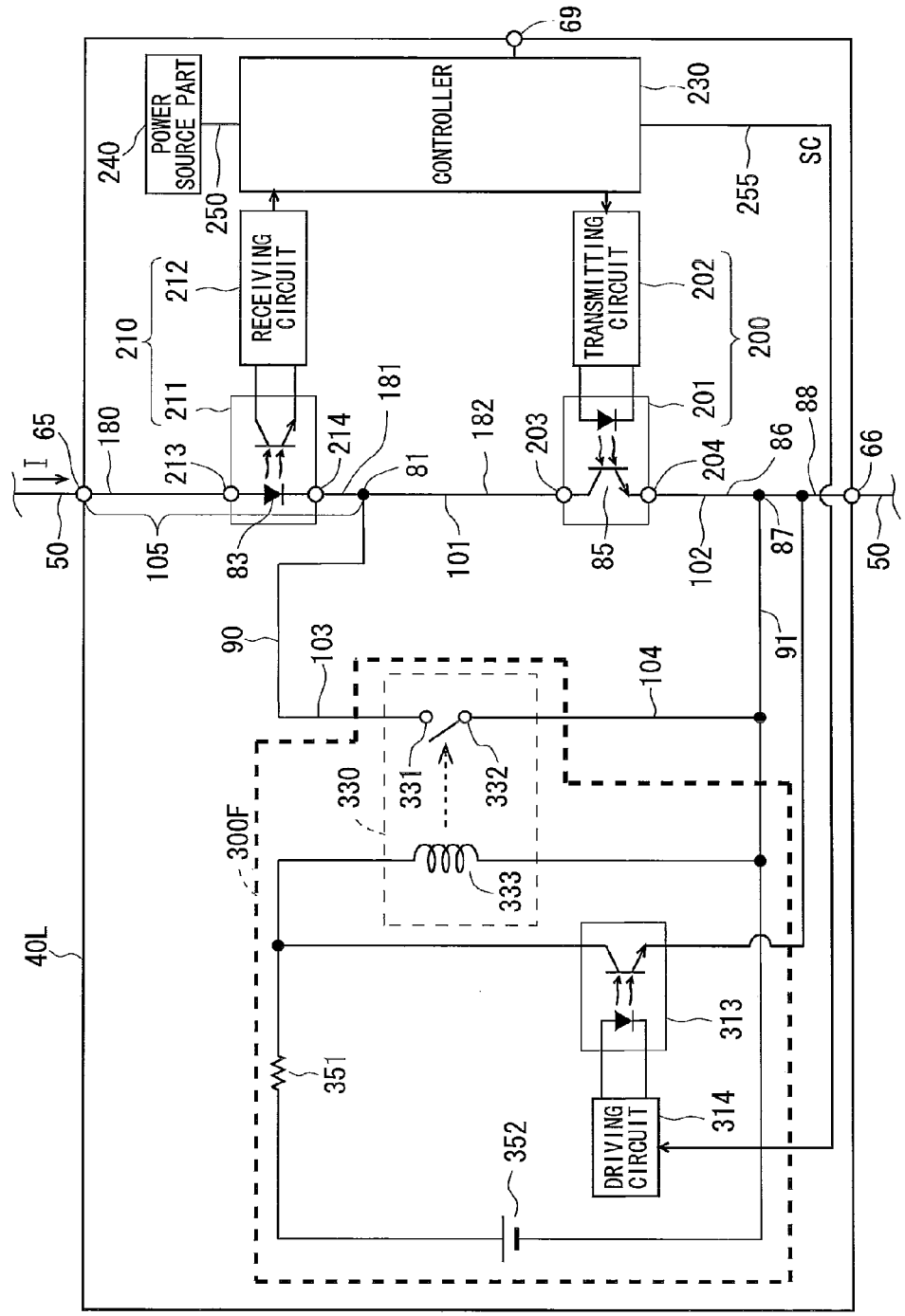
FIG. 19 is a configuration diagram schematically illustrating a fifth example of the submodule according to the seventh embodiment.

The submodule 40L illustrated in FIG. 19 employs a configuration where the switching part 300 is changed to the above-described switching part 300F in the submodule 40H illustrated in FIG. 15. In other words, the submodule 40L employs a configuration where the connection destination of the above one end 81 of the wiring 90 is changed to the wiring connecting the transmitter 200 and the receiver 210 in the submodule 40F illustrated in FIG. 13. Note that, the other configurations of the submodule 40L are the same as the submodules 40H and 40F.

Figure 20:
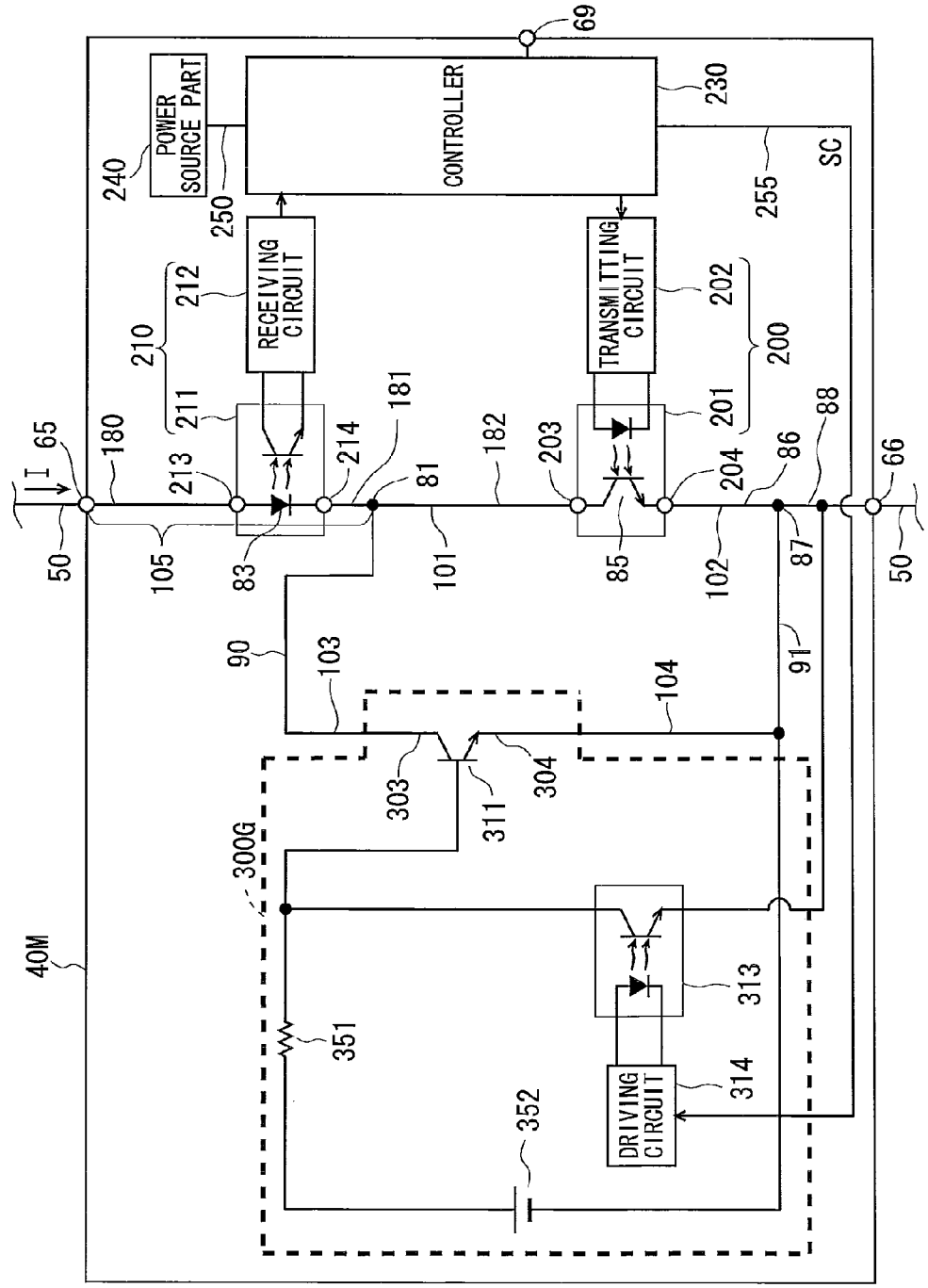
FIG. 20 is a configuration diagram schematically illustrating a sixth example of the submodule according to the seventh embodiment.

The submodule 40M illustrated in FIG. 20 employs a configuration where the switching part 300 is changed to the above-described switching part 300G in the submodule 40H illustrated in FIG. 15. In other words, the submodule 40M employs a configuration where the connection destination of the above one end 81 of the wiring 90 is changed to the wiring connecting the transmitter 200 and the receiver 210 in the submodule 40G illustrated in FIG. 14. Note that, the other configurations of the submodule 40M are the same as the submodules 40H and 40G.

In each of the above submodules 40H to 40M, the wiring 182 forms the first current path 101, the wiring 86 forms the second current path 102, the wiring 90 forms the third current path 103 and the wiring 91 forms the fourth current path 104.

The switching parts 300, 300B, 300E, 300F and 300G in the submodules 40H to 40M operate in the same manner as described above, and thereby the conductive/non-conductive state between the third current path 103 and the fourth current path 104 changes. As a result, the submodules 40H to 40M can also provide the same effect as the above-described submodule 40 (see FIG. 3) and the like.

Further, with the submodules 40H to 40M, when the receiver 210 and the receiving function of various functions of the controller 230 are operable, the receiver 210 can receive signals even if the current paths 103 and 104 are in the conductive state. By this means, the submodules 40H to 40M can, for example, receive a command from the main module 30 (see FIG. 1), and execute processing according to the command.

Figure 21:
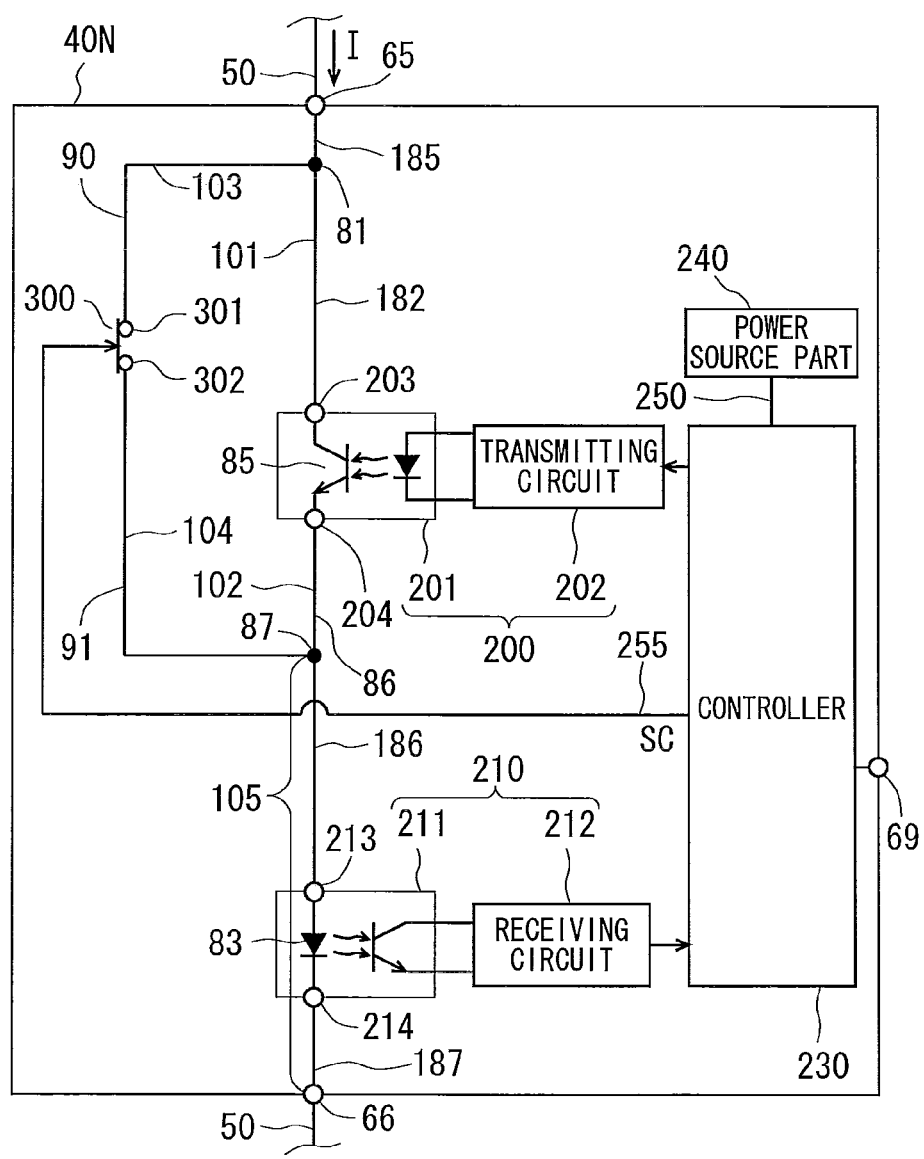
FIG. 21 is a configuration diagram schematically illustrating a seventh example of the submodule according to the seventh embodiment.

Here, FIG. 21 illustrates a configuration of a submodule 40N according to a seventh example of the seventh embodiment. The submodule 40N can be employed as the submodules 41 to 44 of the communication system 20 (see FIG. 1). Note that, in FIG. 21, an accompanying illustration of the device 260 (see FIGS. 3 and 8) is omitted.

The submodule 40N illustrated in FIG. 21 employs a configuration where the order to connect the transmitter 200 and receiver 210 is switched in the submodule 40H illustrated in FIG. 15.

More specifically, with the example of FIG. 21, wirings 185 to 187 are provided instead of the wirings 180, 181 and 88 illustrated in FIG. 15. The wiring 185 connects the signal line connection terminal 65 and connection point 81 between the wirings 182 and 90. Further, the wiring 186 connects the connection point 87 between the wirings 86 and 91 and the anode terminal 213 of the light emitting diode 83 of the receiver 210. Further, the wiring 187 connects the cathode terminal 214 of the light emitting diode 83 of the receiver 210 and the signal line connection terminal 66. Note that, other configurations of the submodule 40N are the same as the submodule 40H.

Similar to the submodule 40H (see FIG. 15), in the submodule 40N, the wiring 182 forms the first current path 101, the wiring 86 forms the second current path 102, the wiring 90 forms the third current path 103 and the wiring 91 forms the fourth current path 104.

The submodule 40N can also provide the same effect as the above-described submodules 40H to 40M.

Note that, in the submodule 40N, the switching part 300 may also be changed to another switching part 300B and the like.

Here, when the submodule 40N is compared with the submodules 40H to 40M, the order to connect the transmitter 200 and the receiver 210 between the signal line connection terminals 65 and 66 is different as described above.

According to this difference, in the submodules 40H to 40M (see FIGS. 15 to 20), a current path (fifth current path) 105 formed with the wiring 180, light emitting diode 83 of the receiver 210 and wiring 181 connects the signal line connection terminal 65 and the above end 81 of the first and third current paths 101 and 103. With this configuration, when the light emitting diode 83 detects the current I flowing in the fifth current path 105, the receiver 210 receives signals.

By contrast with this, in the submodule 40N (see FIG. 21), the current path (fifth current path) 105 provided with the receiver 210 connects the signal line connection terminal 66 and the above one end 87 of the second and fourth current paths 102 and 104. In this case, the fifth current path 105 is formed with the wiring 187, light emitting diode 83 of the receiver 210 and wiring 186.

Even in the case where the fifth current path 105 is provided in any forms, similar to the submodule 40 (see FIG. 3), the transmission phototransistor 85 is electrically connected to the signal line connection terminals 65 and 66, and the reception light emitting diode 83 is also electrically connected with the signal line connection terminals 65 and 66. Hence, in the submodules 40H to 40N, signals are transmitted and received using the same terminals 65 and 66, that is, using the same signal line 50. Consequently, it is possible to simplify a configuration and reduce cost compared to a configuration where signal line connection terminals and external signal lines are separately provided for transmission and reception.

Note that, the above-described notifying part 320 (see FIGS. 10 and 11) may also be added to the submodules 40H to 40N.

<Modification Common to First to Seventh Embodiments>

Although the case has been described as examples above where the communication system 20 is applied to the outdoor unit 12 as illustrated in FIG. 1, application examples of the communication system 20 are not limited thereto. For example, the main module 30 may also be installed in the indoor unit 11B like the air conditioner 10B illustrated in FIG. 22. Further, for example, the part or all of the submodules 41 to 44 may also be installed in the indoor unit, and, in this case, a configuration will be described where, for example, indoor fans operates utilizing communication through submodules. Furthermore, the communication system 20 is also applicable to an air conditioner of a type which does not separate (integrate) an indoor unit and an outdoor unit.

Still further, the communication system 20 is also applicable to various devices other than an air conditioner.

Yet further, for example, a configuration where the receiver 210 is removed from the submodules 40 and 40B to 40N (terminals 213 and 214 are short-circuited in this case) may also be employed as the submodules 41 to 44.

Yet further, all of the submodules 41 to 44 do not necessarily employ the same configuration. Further, although a configuration has been described as an example above where a plurality of modules 41 to 44 are connected in a loop, the submodules 41 to 44 need not to be connected in a loop as long as they are connected in series and can sequentially transmit current signals. Note that, the power source part 110 (see FIG. 2) which supplies a current for a current signal may also be provided in one of the submodules 41 to 44.

Although the present invention has been described in detail, the above description is only examples in all aspects and the present invention is not limited to these. It is construed that an infinite number of modifications which are not described as examples are assumed without deviating from the scope of the present invention.

EXPLANATION OF SYMBOLS 10, 10B AIR CONDITIONER
20 COMMUNICATION SYSTEM
40, 40B to 40N, 41 to 44 SUBMODULE (COMMUNICATION MODULE)
65, 66 SIGNAL LINE CONNECTION TERMINAL
81, 87 ONE END OF CURRENT PATH
101 to 105 CURRENT PATH
200 TRANSMITTER
203, 204, 301 to 304, 331, 332 OTHER END OF CURRENT PATH
210 RECEIVER
230 CONTROLLER
240 POWER SOURCE PART
260 DEVICE
261, 262 FAN
263, 264 COMPRESSOR
300, 300B, 300E to 300G SWITCHING PART
320 NOTIFYING PART
I CURRENT
S11 to S13, S31, S33, S34, S51 to S54 PROCESSING STEP
SC CONTROL SIGNAL

The invention claimed is:

1. A communication module comprising:
first and second signal line connection terminals;
a first current path having one end electrically connected to said first signal line connection terminal;
a second current path having one end electrically connected to said second signal line connection terminal;
a transmitter which sends a signal utilizing a change of a current by changing the current flowing between the other end of said first current path and the other end of said second current path;
a third current path having one end connected to said one end of said first current path;
a fourth current path having one end connected to said one end of said second current path;
a switching part which switches a conductive/non-conductive state between the other end of said third current path and the other end of said fourth current path;
a power source part provided without being electrically connected with said first and second signal line connection terminals; and
a controller which is connected to said transmitter, said switching part and said power source part, and which operates with supply of power from said power source part, and which controls said transmitter and said switching part, wherein
while said switching part brings about the non-conductive state between said other end of said third current path and said other end of said fourth current path by being applied with a control signal from said controller, said switching part brings about the conductive state between said other end of said third current path and said other end of said fourth current path by not being applied said control signal, and
said switching part includes:
a transistor having a collector terminal connected to said other end of said third current path, an emitter terminal connected to said other end of said fourth current path, and a base terminal;
a resistance electrically connected between said base terminal, and said one end of said third current path or said first signal line connection terminal;
a photocoupler having a phototransistor connected between said base terminal and said one end of said fourth current path, and a light emitting diode; and
a driving circuit connected to said controller and making said light emitting diode emit light by being applied with said control signal.

2. The communication module according to claim 1, further comprising
a notifying part which notifies that a current flows in said third or fourth current path.

3. The communication module according to claim 1, wherein
said controller stops outputting said control signal when an interruption to stop communication is acquired from an outside of said module.

4. The communication module according to claim 1, further comprising
a receiver which receives a signal by detecting a current flowing in said first or second current path.

5. The communication module according to claim 4, wherein said controller:
is connected to said receiver; and
performs reception through said receiver in parallel to transmission performed through said transmitter, and stops outputting said control signal when determining that the transmitted signal and the received signal do not match.

6. The communication module according to claim 1, further comprising:
a fifth current path which is provided as a current path for connecting said first signal line connection terminal and said one end of said first current path or a current path for connecting said second signal line connection terminal and said one end of said second current path; and
a receiver which receives a signal by detecting a current flowing in said fifth current path.

7. The communication module according to claim 6, wherein said controller:
is connected to said receiver; and
performs reception through said receiver in parallel to transmission performed through said transmitter, and stops outputting said control signal when determining that the transmitted signal and the received signal do not match.

8. A communication system comprising
a plurality of communication modules each identical with the communication module according to claim 1, wherein
said plurality of communication modules are connected in series by electrically connecting said second signal line connection terminal of one of the communication modules to said first signal line connection terminal of the different communication module sequentially.

9. An air conditioner comprising:
a communication system according to claim 8; and
a plurality of devices which are each connected to one of said plurality of communication modules and each operate utilizing communication through said communication modules, wherein
said plurality of devices each include at least one of:
a compressor which compresses gaseous refrigerant, and
a fan which blows air to a heat exchanger in which said refrigerant flows.

10. The air conditioner according to claim 9, wherein said plurality of devices include a plurality of devices of the same type.

* * * * *